(12) United States Patent
Philip et al.

(10) Patent No.: US 9,742,630 B2
(45) Date of Patent: Aug. 22, 2017

(54) CONFIGURABLE ROUTER FOR A NETWORK ON CHIP (NOC)

(71) Applicant: NetSpeed Systems, San Jose, CA (US)

(72) Inventors: Joji Philip, San Jose, CA (US); Sailesh Kumar, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 50 days.

(21) Appl. No.: 14/493,018

(22) Filed: Sep. 22, 2014

(65) Prior Publication Data

US 2017/0063625 A1    Mar. 2, 2017

(51) Int. Cl.
| H04L 12/28 | (2006.01) |
| H04L 12/24 | (2006.01) |
| H04L 12/933 | (2013.01) |
| H04L 12/713 | (2013.01) |
| H04L 12/721 | (2013.01) |
| H04L 12/725 | (2013.01) |

(52) U.S. Cl.
CPC .......... *H04L 41/0889* (2013.01); *H04L 45/06* (2013.01); *H04L 45/302* (2013.01); *H04L 45/586* (2013.01); *H04L 49/109* (2013.01)

(58) Field of Classification Search
None
See application file for complete search history.

(56) References Cited

U.S. PATENT DOCUMENTS

| 4,409,838 A | 10/1983 | Schomberg |
| 4,933,933 A | 6/1990 | Dally et al. |
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |
| 5,563,003 A | 10/1996 | Suzuki et al. |
| 5,583,990 A | 12/1996 | Birrittella et al. |
| 5,588,152 A | 12/1996 | Dapp et al. |
| 5,764,740 A | 6/1998 | Holender |
| 5,790,554 A | 8/1998 | Pitcher |

(Continued)

FOREIGN PATENT DOCUMENTS

| CN | 103684961 A | 3/2014 |
| KR | 10-2013-0033898 A1 | 4/2013 |

(Continued)

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Bob Phunkulh
(74) *Attorney, Agent, or Firm* — Procopio, Cory, Hargreaves & Savitch LLP

(57) ABSTRACT

Example implementations described herein are directed to a configurable building block, such as a router, for implementation of a Network on Chip (NoC). The router is parameterized by a software layer, which can include the number of virtual channels for a port, the number of ports, the membership information of the virtual channels, clock domain, and so forth. The router may further be configured to implement arbitration techniques and flit processing techniques based on the parameters specified by the software layer.

18 Claims, 21 Drawing Sheets

(56) References Cited

U.S. PATENT DOCUMENTS

| | | |
|---|---|---|
| 5,859,981 A | 1/1999 | Levin et al. |
| 5,991,308 A | 11/1999 | Fuhrmann et al. |
| 5,999,530 A | 12/1999 | LeMaire |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,415,282 B1 | 7/2002 | Mukherjea et al. |
| 6,674,720 B1 | 1/2004 | Passint et al. |
| 6,701,361 B1 | 3/2004 | Meier |
| 6,711,717 B2 | 3/2004 | Nystrom et al. |
| 6,778,531 B1 | 8/2004 | Kodialam |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,260,808 B1 | 8/2007 | Pasqualini |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,590,959 B2 | 9/2009 | Tanaka |
| 7,639,037 B1 | 12/2009 | Eberle |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,886,261 B1 | 2/2011 | Irving |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,098,677 B1 | 1/2012 | Pleshek |
| 8,099,757 B2 | 1/2012 | Riedle et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,503,445 B2 | 8/2013 | Lo |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,572,353 B1 | 10/2013 | Bratt |
| 8,601,288 B2 | 12/2013 | Brinks |
| 8,601,423 B1 | 12/2013 | Philip et al. |
| 8,614,955 B2 | 12/2013 | Gintis |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 * | 4/2014 | Abts .................. H04L 12/569 370/238 |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 8,885,510 B2 | 11/2014 | Kumar et al. |
| 9,158,882 B2 | 10/2015 | Kumar |
| 9,281,026 B2 | 3/2016 | Felch |
| 9,317,291 B2 * | 4/2016 | Muff .................. G06F 9/38 |
| 9,317,294 B2 * | 4/2016 | Muff .................. G06F 9/3836 |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2002/0150094 A1 | 10/2002 | Cheng |
| 2003/0005149 A1 | 1/2003 | Haas |
| 2003/0088602 A1 | 5/2003 | Dutta et al. |
| 2003/0145314 A1 | 7/2003 | Nguyen et al. |
| 2003/0200315 A1 | 10/2003 | Goldenberg |
| 2004/0019814 A1 | 1/2004 | Pappalardo |
| 2004/0049565 A1 | 3/2004 | Keller et al. |
| 2004/0103218 A1 | 5/2004 | Blumrich et al. |
| 2004/0156376 A1 | 8/2004 | Nakagawa |
| 2004/0156383 A1 | 8/2004 | Nakagawa |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2006/0031615 A1 | 2/2006 | Bruce et al. |
| 2006/0053312 A1 | 3/2006 | Jones |
| 2006/0075169 A1 | 4/2006 | Harris et al. |
| 2006/0104274 A1 | 5/2006 | Caviglia |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0127014 A1 | 5/2008 | Pandey |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen |
| 2009/0067348 A1 | 3/2009 | Vasseur |
| 2009/0070726 A1 | 3/2009 | Mehrotra et al. |
| 2009/0083263 A1 | 3/2009 | Felch |
| 2009/0089725 A1 | 4/2009 | Khan |
| 2009/0109996 A1 * | 4/2009 | Hoover .................. H04L 45/00 370/463 |
| 2009/0122703 A1 | 5/2009 | Gangwal et al. |
| 2009/0125574 A1 * | 5/2009 | Mejdrich .................. H04L 49/109 |
| 2009/0125703 A1 * | 5/2009 | Mejdrich .................. G06F 15/7825 712/30 |
| 2009/0125706 A1 * | 5/2009 | Hoover .................. G06F 9/30047 712/225 |
| 2009/0135739 A1 * | 5/2009 | Hoover .................. G06F 15/7825 370/257 |
| 2009/0138567 A1 * | 5/2009 | Hoover .................. G06F 15/16 709/215 |
| 2009/0150647 A1 * | 6/2009 | Mejdrich .................. G06F 9/30036 712/3 |
| 2009/0157976 A1 * | 6/2009 | Comparan .................. G06F 12/0808 711/141 |
| 2009/0172304 A1 | 7/2009 | Gueron et al. |

(56) References Cited

U.S. PATENT DOCUMENTS

| | | | |
|---|---|---|---|
| 2009/0182944 A1* | 7/2009 | Comparan | G06F 12/0888 711/122 |
| 2009/0182954 A1* | 7/2009 | Mejdrich | G06F 12/0808 711/141 |
| 2009/0182986 A1* | 7/2009 | Schwinn | G06F 1/206 712/214 |
| 2009/0182987 A1* | 7/2009 | Mejdrich | G06F 1/3203 712/215 |
| 2009/0187716 A1* | 7/2009 | Comparan | G06F 12/0833 711/141 |
| 2009/0187734 A1* | 7/2009 | Mejdrich | G06F 9/30036 712/22 |
| 2009/0187756 A1 | 7/2009 | Nollet et al. | |
| 2009/0201302 A1* | 8/2009 | Hoover | G06T 1/20 345/502 |
| 2009/0210184 A1 | 8/2009 | Medardoni et al. | |
| 2009/0210883 A1* | 8/2009 | Hoover | G06F 15/7825 719/312 |
| 2009/0228681 A1* | 9/2009 | Mejdrich | G06F 9/30032 712/7 |
| 2009/0228682 A1* | 9/2009 | Mejdrich | G06F 9/30032 712/7 |
| 2009/0228689 A1* | 9/2009 | Muff | G06F 9/3838 712/219 |
| 2009/0228690 A1* | 9/2009 | Muff | G06F 9/3838 712/219 |
| 2009/0231348 A1* | 9/2009 | Mejdrich | G06T 15/005 345/506 |
| 2009/0231349 A1* | 9/2009 | Mejdrich | G06T 15/005 345/506 |
| 2009/0240920 A1* | 9/2009 | Muff | G06F 9/30043 712/218 |
| 2009/0245257 A1* | 10/2009 | Comparan | H04L 45/00 370/392 |
| 2009/0256836 A1* | 10/2009 | Fowler | G06T 15/06 345/419 |
| 2009/0260013 A1* | 10/2009 | Heil | G06F 15/7825 718/103 |
| 2009/0268677 A1 | 10/2009 | Chou et al. | |
| 2009/0271172 A1* | 10/2009 | Mejdrich | G06F 9/45554 703/26 |
| 2009/0276572 A1* | 11/2009 | Heil | G06F 12/128 711/118 |
| 2009/0282139 A1* | 11/2009 | Mejdrich | G06F 9/45533 709/223 |
| 2009/0282197 A1* | 11/2009 | Comparan | G06F 12/126 711/142 |
| 2009/0282211 A1* | 11/2009 | Hoover | G06F 12/1483 711/173 |
| 2009/0282214 A1* | 11/2009 | Kuesel | G06F 9/30036 712/29 |
| 2009/0282221 A1* | 11/2009 | Heil | G06F 9/3851 712/214 |
| 2009/0282222 A1* | 11/2009 | Hoover | G06F 15/17356 712/220 |
| 2009/0282226 A1* | 11/2009 | Hoover | G06F 15/7825 712/225 |
| 2009/0282227 A1* | 11/2009 | Hoover | G06F 11/3404 712/227 |
| 2009/0282419 A1* | 11/2009 | Mejdrich | H04L 47/10 719/314 |
| 2009/0285222 A1* | 11/2009 | Hoover | H04L 45/06 370/397 |
| 2009/0287885 A1* | 11/2009 | Kriegel | G06F 9/3824 711/143 |
| 2009/0292907 A1* | 11/2009 | Schwinn | G06F 1/3203 712/229 |
| 2009/0293061 A1* | 11/2009 | Schwinn | G06F 9/3851 718/103 |
| 2009/0300292 A1 | 12/2009 | Fang et al. | |
| 2009/0300335 A1* | 12/2009 | Muff | G06F 9/30181 712/221 |
| 2009/0307714 A1* | 12/2009 | Hoover | H04L 45/00 719/314 |
| 2009/0313592 A1 | 12/2009 | Murali et al. | |
| 2009/0315908 A1* | 12/2009 | Comparan | G06T 15/04 345/582 |
| 2010/0023568 A1* | 1/2010 | Hickey | G06F 7/483 708/209 |
| 2010/0031009 A1* | 2/2010 | Muff | G06F 9/3802 712/222 |
| 2010/0040162 A1 | 2/2010 | Suehiro | |
| 2010/0042812 A1* | 2/2010 | Hickey | G06F 9/30181 712/208 |
| 2010/0042813 A1* | 2/2010 | Hickey | G06F 9/3836 712/219 |
| 2010/0070714 A1* | 3/2010 | Hoover | G06F 12/0842 711/128 |
| 2010/0091787 A1* | 4/2010 | Muff | H04L 49/10 370/419 |
| 2010/0100707 A1* | 4/2010 | Mejdrich | H04L 45/58 712/205 |
| 2010/0100712 A1* | 4/2010 | Mejdrich | G06F 9/22 712/214 |
| 2010/0100770 A1* | 4/2010 | Mejdrich | G06F 11/362 714/37 |
| 2010/0100934 A1* | 4/2010 | Mejdrich | G06F 21/74 726/3 |
| 2010/0106940 A1* | 4/2010 | Muff | G06F 9/30032 712/7 |
| 2010/0125722 A1* | 5/2010 | Hickey | G06F 9/3851 712/228 |
| 2010/0158005 A1 | 6/2010 | Mukhopadhyay et al. | |
| 2010/0162019 A1 | 6/2010 | Kumar | |
| 2010/0189111 A1* | 7/2010 | Muff | G06F 9/30109 370/400 |
| 2010/0191940 A1* | 7/2010 | Mejdrich | G06F 9/30174 712/226 |
| 2010/0211718 A1 | 8/2010 | Gratz et al. | |
| 2010/0223505 A1 | 9/2010 | Andreev et al. | |
| 2010/0228781 A1* | 9/2010 | Fowler | G06T 11/40 707/791 |
| 2010/0239185 A1* | 9/2010 | Fowler | G06T 15/06 382/291 |
| 2010/0239186 A1* | 9/2010 | Fowler | G06T 15/06 382/291 |
| 2010/0242003 A1 | 9/2010 | Kwok | |
| 2010/0269123 A1* | 10/2010 | Mejdrich | H04L 43/0817 719/318 |
| 2010/0284309 A1 | 11/2010 | Allan | |
| 2010/0333099 A1* | 12/2010 | Kupferschmidt | G06F 9/546 718/103 |
| 2011/0022754 A1 | 1/2011 | Cidon et al. | |
| 2011/0035523 A1 | 2/2011 | Feero et al. | |
| 2011/0044336 A1 | 2/2011 | Umeshima | |
| 2011/0060831 A1 | 3/2011 | Ishii et al. | |
| 2011/0063285 A1* | 3/2011 | Hoover | G06T 15/005 345/419 |
| 2011/0064077 A1 | 3/2011 | Wen | |
| 2011/0072407 A1 | 3/2011 | Keinert et al. | |
| 2011/0085550 A1 | 4/2011 | Lecler et al. | |
| 2011/0103799 A1 | 5/2011 | Shacham et al. | |
| 2011/0119322 A1 | 5/2011 | Li | |
| 2011/0154282 A1 | 6/2011 | Chang et al. | |
| 2011/0173258 A1* | 7/2011 | Arimilli | G06F 15/16 709/204 |
| 2011/0191774 A1 | 8/2011 | Hsu et al. | |
| 2011/0235531 A1 | 9/2011 | Vangal et al. | |
| 2011/0276937 A1 | 11/2011 | Waller | |
| 2011/0289485 A1* | 11/2011 | Mejdrich | G06F 11/3636 717/128 |
| 2011/0292063 A1* | 12/2011 | Mejdrich | G06T 1/20 345/582 |
| 2011/0302345 A1 | 12/2011 | Boucard et al. | |
| 2011/0302450 A1* | 12/2011 | Hickey | G06F 11/1641 714/17 |
| 2011/0307734 A1 | 12/2011 | Boesen et al. | |
| 2011/0316864 A1* | 12/2011 | Mejdrich | G06T 1/20 345/506 |

(56) References Cited

U.S. PATENT DOCUMENTS

| | | | |
|---|---|---|---|
| 2011/0320719 A1* | 12/2011 | Mejdrich | G06T 15/005 711/120 |
| 2011/0320724 A1* | 12/2011 | Mejdrich | G06F 13/28 711/125 |
| 2011/0320771 A1* | 12/2011 | Mejdrich | G06F 12/0853 712/201 |
| 2011/0320854 A1 | 12/2011 | Elrabaa | |
| 2011/0320991 A1 | 12/2011 | Hsu | |
| 2011/0321057 A1* | 12/2011 | Mejdrich | G06F 9/505 718/105 |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0054511 A1 | 3/2012 | Brinks | |
| 2012/0072635 A1 | 3/2012 | Yoshida | |
| 2012/0079147 A1 | 3/2012 | Ishii et al. | |
| 2012/0099475 A1 | 4/2012 | Tokuoka | |
| 2012/0110106 A1 | 5/2012 | De Lescure et al. | |
| 2012/0110541 A1 | 5/2012 | Ge et al. | |
| 2012/0155250 A1 | 6/2012 | Carney et al. | |
| 2012/0173846 A1 | 7/2012 | Wang et al. | |
| 2012/0176364 A1* | 7/2012 | Schardt | G06T 15/005 345/419 |
| 2012/0198408 A1 | 8/2012 | Chopra | |
| 2012/0209944 A1 | 8/2012 | Mejdrich et al. | |
| 2012/0218998 A1 | 8/2012 | Sarikaya | |
| 2012/0221711 A1* | 8/2012 | Kuesel | H04L 67/28 709/224 |
| 2012/0260252 A1* | 10/2012 | Kuesel | G06F 9/4881 718/102 |
| 2012/0311512 A1 | 12/2012 | Michel | |
| 2013/0021896 A1 | 1/2013 | Pu | |
| 2013/0028083 A1 | 1/2013 | Yoshida | |
| 2013/0028090 A1 | 1/2013 | Yamaguchi et al. | |
| 2013/0028261 A1 | 1/2013 | Lee | |
| 2013/0036296 A1* | 2/2013 | Hickey | G06F 9/30014 712/222 |
| 2013/0044117 A1* | 2/2013 | Mejdrich | G06F 9/30 345/501 |
| 2013/0046518 A1* | 2/2013 | Mejdrich | G06T 1/20 703/2 |
| 2013/0051397 A1 | 2/2013 | Guo et al. | |
| 2013/0054811 A1 | 2/2013 | Harrand | |
| 2013/0073771 A1 | 3/2013 | Hanyu | |
| 2013/0073878 A1 | 3/2013 | Jayasimha | |
| 2013/0080073 A1 | 3/2013 | de Corral | |
| 2013/0080671 A1* | 3/2013 | Ishii | G06F 13/14 710/110 |
| 2013/0086399 A1 | 4/2013 | Tychon | |
| 2013/0103369 A1 | 4/2013 | Huynh et al. | |
| 2013/0103912 A1 | 4/2013 | Jones et al. | |
| 2013/0111190 A1* | 5/2013 | Muff | G06F 9/3832 712/208 |
| 2013/0111242 A1 | 5/2013 | Heller | |
| 2013/0117543 A1 | 5/2013 | Venkataramanan et al. | |
| 2013/0138925 A1* | 5/2013 | Hickey | G06F 9/383 712/214 |
| 2013/0145128 A1* | 6/2013 | Schardt | G06F 9/3851 712/215 |
| 2013/0148506 A1 | 6/2013 | Lea | |
| 2013/0151215 A1 | 6/2013 | Mustapha | |
| 2013/0159668 A1* | 6/2013 | Muff | G06F 15/8053 712/7 |
| 2013/0159669 A1* | 6/2013 | Comparan | G06F 9/544 712/29 |
| 2013/0159674 A1* | 6/2013 | Muff | G06F 9/30072 712/208 |
| 2013/0159675 A1* | 6/2013 | Muff | G06F 9/30072 712/208 |
| 2013/0159676 A1* | 6/2013 | Muff | G06F 9/30101 712/208 |
| 2013/0159944 A1 | 6/2013 | Uno et al. | |
| 2013/0160026 A1 | 6/2013 | Kuesel | |
| 2013/0160114 A1* | 6/2013 | Greenwood | G06F 21/6218 726/21 |
| 2013/0163615 A1 | 6/2013 | Mangano et al. | |
| 2013/0174113 A1 | 7/2013 | Lecler et al. | |
| 2013/0179613 A1 | 7/2013 | Boucard et al. | |
| 2013/0179902 A1 | 7/2013 | Hoover et al. | |
| 2013/0185542 A1* | 7/2013 | Mejdrich | G06F 9/3877 712/214 |
| 2013/0191572 A1 | 7/2013 | Nooney et al. | |
| 2013/0191600 A1* | 7/2013 | Kuesel | G06F 13/28 711/136 |
| 2013/0191649 A1* | 7/2013 | Muff | G06F 12/1408 713/190 |
| 2013/0191651 A1* | 7/2013 | Muff | G06F 12/1027 713/193 |
| 2013/0191824 A1* | 7/2013 | Muff | G06F 9/45558 718/1 |
| 2013/0191825 A1* | 7/2013 | Muff | G06F 9/30 718/1 |
| 2013/0207801 A1 | 8/2013 | Barnes | |
| 2013/0219148 A1 | 8/2013 | Chen et al. | |
| 2013/0250792 A1 | 9/2013 | Yoshida et al. | |
| 2013/0254488 A1 | 9/2013 | Kaxiras et al. | |
| 2013/0263068 A1 | 10/2013 | Cho et al. | |
| 2013/0268990 A1 | 10/2013 | Urzi et al. | |
| 2013/0305207 A1 | 11/2013 | Hsieh | |
| 2013/0311819 A1 | 11/2013 | Ishii | |
| 2013/0326458 A1 | 12/2013 | Kazda et al. | |
| 2014/0013293 A1 | 1/2014 | Hsu | |
| 2014/0068132 A1 | 3/2014 | Philip et al. | |
| 2014/0086260 A1* | 3/2014 | Dai | H04L 47/6275 370/414 |
| 2014/0092740 A1 | 4/2014 | Wang et al. | |
| 2014/0098683 A1 | 4/2014 | Kumar et al. | |
| 2014/0112149 A1 | 4/2014 | Urzi et al. | |
| 2014/0115218 A1 | 4/2014 | Philip et al. | |
| 2014/0115298 A1 | 4/2014 | Philip et al. | |
| 2014/0126572 A1 | 5/2014 | Hutton | |
| 2014/0143557 A1* | 5/2014 | Kuesel | G06F 1/26 713/300 |
| 2014/0143558 A1* | 5/2014 | Kuesel | G06F 1/26 713/300 |
| 2014/0149720 A1* | 5/2014 | Muff | G06F 9/3001 712/222 |
| 2014/0164465 A1* | 6/2014 | Muff | G06F 7/483 708/501 |
| 2014/0164704 A1* | 6/2014 | Kuesel | G06F 12/0802 711/122 |
| 2014/0164732 A1* | 6/2014 | Muff | G06F 12/1027 711/207 |
| 2014/0164734 A1* | 6/2014 | Muff | G06F 9/3836 712/16 |
| 2014/0211622 A1 | 7/2014 | Kumar et al. | |
| 2014/0229709 A1* | 8/2014 | Kuesel | G06F 15/76 712/36 |
| 2014/0229712 A1* | 8/2014 | Muff | G06F 9/30145 712/208 |
| 2014/0229713 A1* | 8/2014 | Muff | G06F 9/30145 712/208 |
| 2014/0229714 A1* | 8/2014 | Muff | G06F 9/38 712/208 |
| 2014/0229720 A1* | 8/2014 | Hickey | G06F 1/324 712/240 |
| 2014/0230077 A1* | 8/2014 | Muff | G06F 9/45533 726/30 |
| 2014/0232188 A1 | 8/2014 | Cheriyan | |
| 2014/0241376 A1* | 8/2014 | Balkan | H04L 47/6275 370/429 |
| 2014/0254388 A1 | 9/2014 | Kumar et al. | |
| 2014/0281243 A1 | 9/2014 | Shalf | |
| 2014/0281402 A1* | 9/2014 | Comparan | G06F 9/30189 712/214 |
| 2014/0307590 A1 | 10/2014 | Dobbelaere | |
| 2014/0359641 A1* | 12/2014 | Clark | G06F 9/542 719/318 |
| 2014/0376569 A1 | 12/2014 | Philip | |

(56) References Cited

U.S. PATENT DOCUMENTS

| | | | |
|---|---|---|---|
| 2015/0020078 A1* | 1/2015 | Kuesel | G06F 9/4881 718/105 |
| 2015/0026435 A1* | 1/2015 | Muff | G06F 9/3012 712/208 |
| 2015/0026494 A1 | 1/2015 | Bainbridge | |
| 2015/0026500 A1* | 1/2015 | Muff | G06F 1/3287 713/324 |
| 2015/0032988 A1* | 1/2015 | Muff | G06F 12/10 711/206 |
| 2015/0032999 A1* | 1/2015 | Muff | G06F 9/30149 712/210 |
| 2015/0043575 A1 | 2/2015 | Kumar et al. | |
| 2015/0081941 A1* | 3/2015 | Brown | G06F 13/362 710/116 |
| 2015/0103822 A1 | 4/2015 | Gianchandani | |
| 2015/0109024 A1* | 4/2015 | Abdelfattah | H03K 19/017581 326/41 |
| 2015/0159330 A1 | 6/2015 | Weisman et al. | |
| 2015/0178435 A1 | 6/2015 | Kumar | |
| 2015/0331831 A1* | 11/2015 | Solihin | H04L 49/109 709/212 |
| 2015/0348600 A1 | 12/2015 | Bhatia | |
| 2015/0381707 A1 | 12/2015 | How | |

FOREIGN PATENT DOCUMENTS

| | | | |
|---|---|---|---|
| WO | 2010074872 A1 | 7/2010 | |
| WO | 2013063484 A1 | 5/2013 | |
| WO | 2014059024 A1 | 4/2014 | |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al. CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

International Search Report and Written Opinion for PCT/US2014/023625, Jul. 10, 2014, 9 pgs.

Bolotin, Evgency, et al., "QNoC: QoS Architecture and Design Process for Network on Chip" 2004, 24 pages, Journal of Systems Architecture 50 (2004) 105-128 Elsevier.

Hestness, J., et al., Netrace: Dependency-Tracking for Efficient Network-on-Chip Experimentation, The University of Texas at Austin, Dept. of Computer Science, May 2011, 20 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Zaman, Aanam, "Formal Verification of Circuit-Switched Network on Chip (NoC) Architectures using SPIN", Oosman Hasan, IEEE © 2014, 8 pages.

International Search Report and Written Opinion for PCT/US2014/048190, Nov. 28, 2014, 11 pgs. International Searching Authority/KR, Daejeon Metropolitan City, Republic of Korea.

International Search Report and Written Opinion for PCT/US2014/060745, Jan. 21, 2015, 10 pgs. International Searching Authority/KR, Daejeon Metropolitan City, Republic of Korea.

International Search Report and Written Opinion for PCT/US2014/060879, Jan. 21, 2015, 10 pgs. International Searching Authority/KR, Daejeon Metropolitan City, Republic of Korea.

International Search Report and Written Opinion for PCT/US2014/060892, Jan. 27, 2015, 10 pgs. International Searching Authority/KR, Daejeon Metropolitan City, Republic of Korea.

International Search Report and Written Opinion for PCT/US2014/060886, Jan. 26, 2015, 10 pgs. International Searching Authority/KR, Daejeon Metropolitan City, Republic of Korea.

International Search Report and Written Opinion for PCT/US2015/015604, mailed May 28, 2015, 11 pages. International Searching Authority/KR, Daejeon Metropolitan City, Republic of Korea.

International Search Report and Written Opinion for PCT/US2014/037902, mailed Sep. 30, 2014, 14 pages. International Searching Authority/KR, Daejeon Metropolitan City, Republic of Korea.

* cited by examiner

CONFIGURABLE ROUTER FOR A NETWORK ON CHIP (NOC)

BACKGROUND

Technical Field

Methods and example implementations described herein are generally directed to NoC interconnect architecture, and more specifically, to provide a configurable NoC router for connecting different hosts with NoC.

Related Art

The number of components on a chip is rapidly growing due to increasing levels of integration, system complexity, and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintain packet ordering, and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example, in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet route and key message level information along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels.

A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic flows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer, which is then routed to the destination on the same NoC layer. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers of different layers, wherein, for instance, a router connected to host in the first layer is shown as R1, and a router connected to the same host in the second layer is shown as R2. In this example, the multi-layer NoC is different from the 3D NoC. In this case multiple layers are on a single silicon die and are used to meet the high bandwidth demands of the communication between hosts on the same silicon die. Messages do not go from one layer to another. For purposes of clarity, the present disclosure will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right combination of routers, channels, and interconnections for a given system remains a challenge and time consuming manual process, often resulting in sub-optimal and inefficient designs.

In related art implementations of routers, the routers are static entities that are not readily configurable. Specifically, the router is a hardware element that is built in a consistent manner that is not adjustable based on the requirements at different locations of the network.

SUMMARY

The present disclosure is directed to a configurable and programmable building block such as a router for use in NoC. The router in example implementations may be implemented in an application specific integrated circuit (ASIC) flow where it is configured statically based on specifications from a software layer and/or can be a hardware element that is dynamically customizable by a software layer, such as in an Field Programmable Gate Array (FPGA) application Aspects of the present disclosure may include a router for a NoC including a plurality of ports, each port configured with one or more virtual channels (VCs), wherein each VC is associated with a VC buffer and is configured to be connected to a specified set of output port(s) or output VCs of the output ports based on a membership specified by a specification. In an additional aspect, the number of input and/or output ports and/or the number of VCs to be enabled/disabled for each input and/or output port can be specified by the specification, wherein size of each of the input VCs and/or size of each VC buffer can also be defined by the same or a different specification. In yet another additional aspect, router of the present disclosure can include a controller configured to upsize/downsize incoming flits received at one or more VCs of input ports and can further be configured to direct the flit to a configured/selected output port based on size ratio of input VCs and output VCs. In another additional aspect, router of the present disclosure can include a VC arbitrator configured to receive a flit having routing information, and arbitrate the flit/packet/message to perform output port selection based on the routing information.

Aspects of the present disclosure may further include a semiconductor device configured with a NoC generated from a specification, wherein the device includes one or more hosts and a router including a plurality of ports, each port configured with one or more virtual channels (VCs), wherein each VC is associated with a VC buffer and is configured to connected to a specified set of output port(s) or output VCs of the output ports based on a membership specified by a specification. In an additional aspect, the number of input ports and/or the number of VCs to be enabled/disabled for each input port can be specified by the specification, wherein the size of each of the input VCs and/or size of each VC buffer can also be defined by the same or a different specification. In yet another additional aspect, router of the present disclosure can include a controller configured to upsize/downsize incoming flits received at one or more VCs of input ports and can further be configured to direct the flit to a configured/selected output port based on size ratio of input VCs and output VCs. In another additional aspect, router of the present disclosure can include a VC arbitrator configured to receive a flit having routing information, and arbitrate the flit/packet/message to perform output port selection based on the routing information.

The foregoing and other objects, features and advantages of the example implementations will be apparent and the following more particular descriptions of example implementations as illustrated in the accompanying drawings wherein like reference numbers generally represent like parts.

DETAILED DESCRIPTION

Figure 1A:
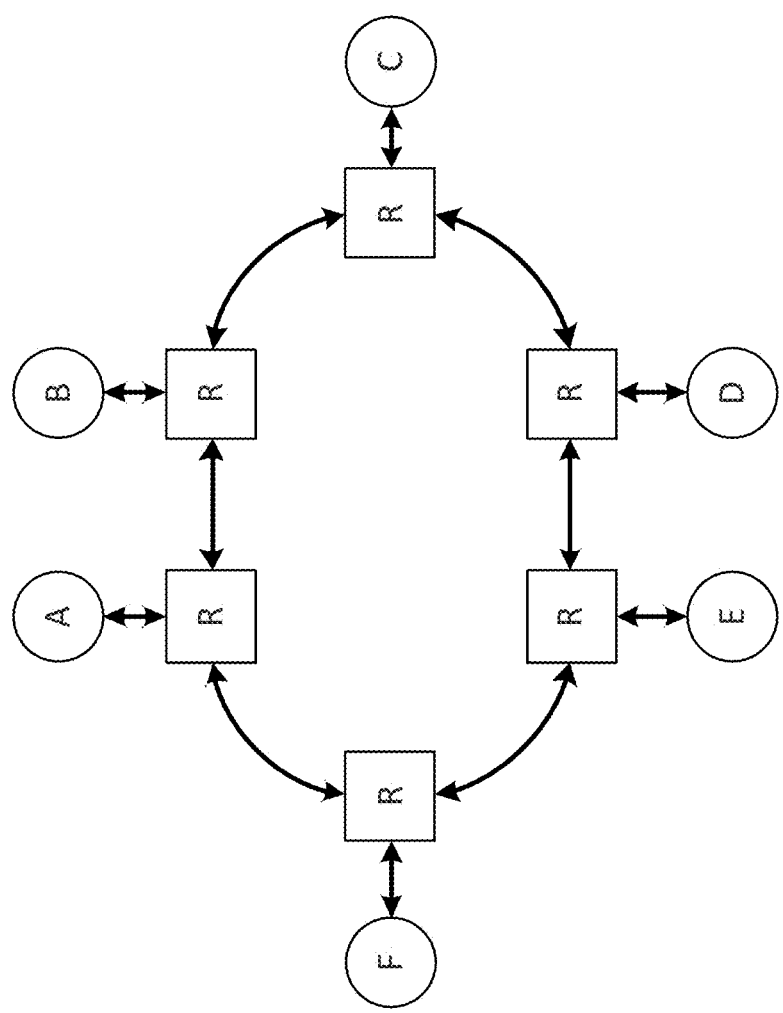
FIGS. 1(a), 1(b) 1(c) and 1(d) illustrate examples of Bidirectional ring, 2D Mesh, 2D Torus, and 3D Mesh NoC Topologies.
Figure 1B:
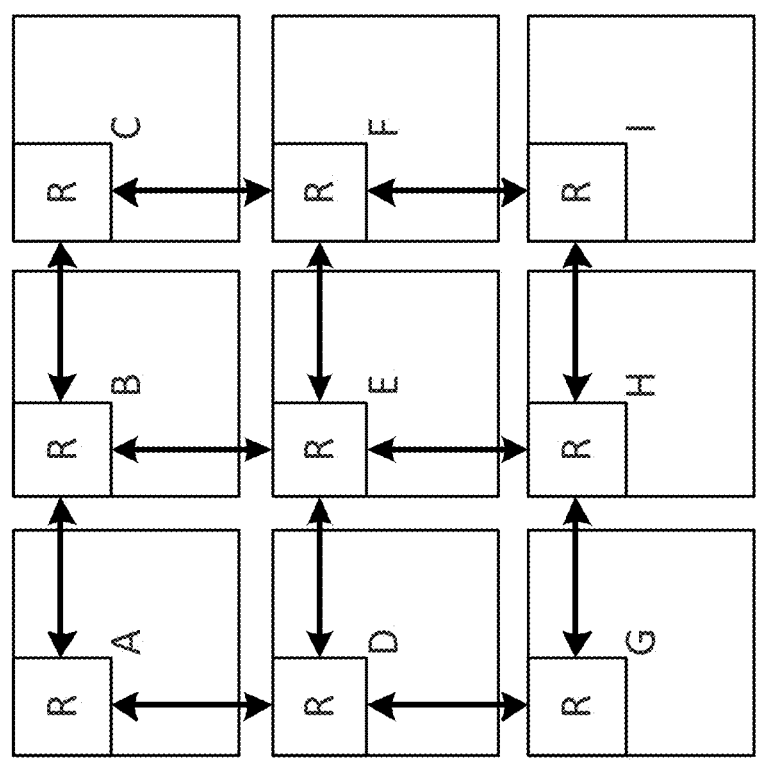
Figure 1C:
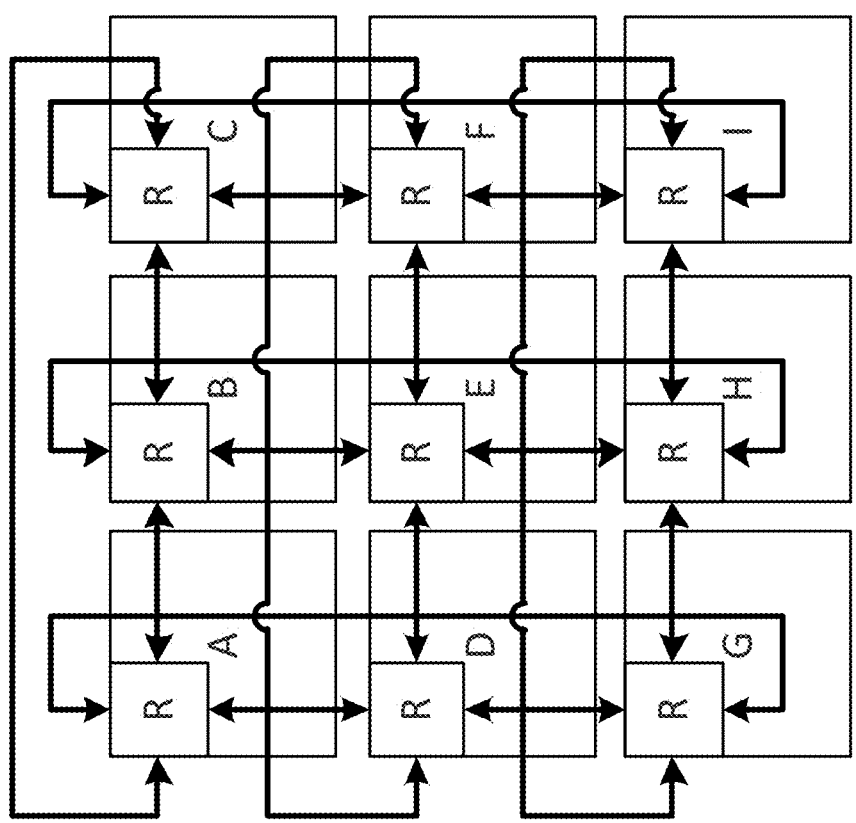
Figure 1D:
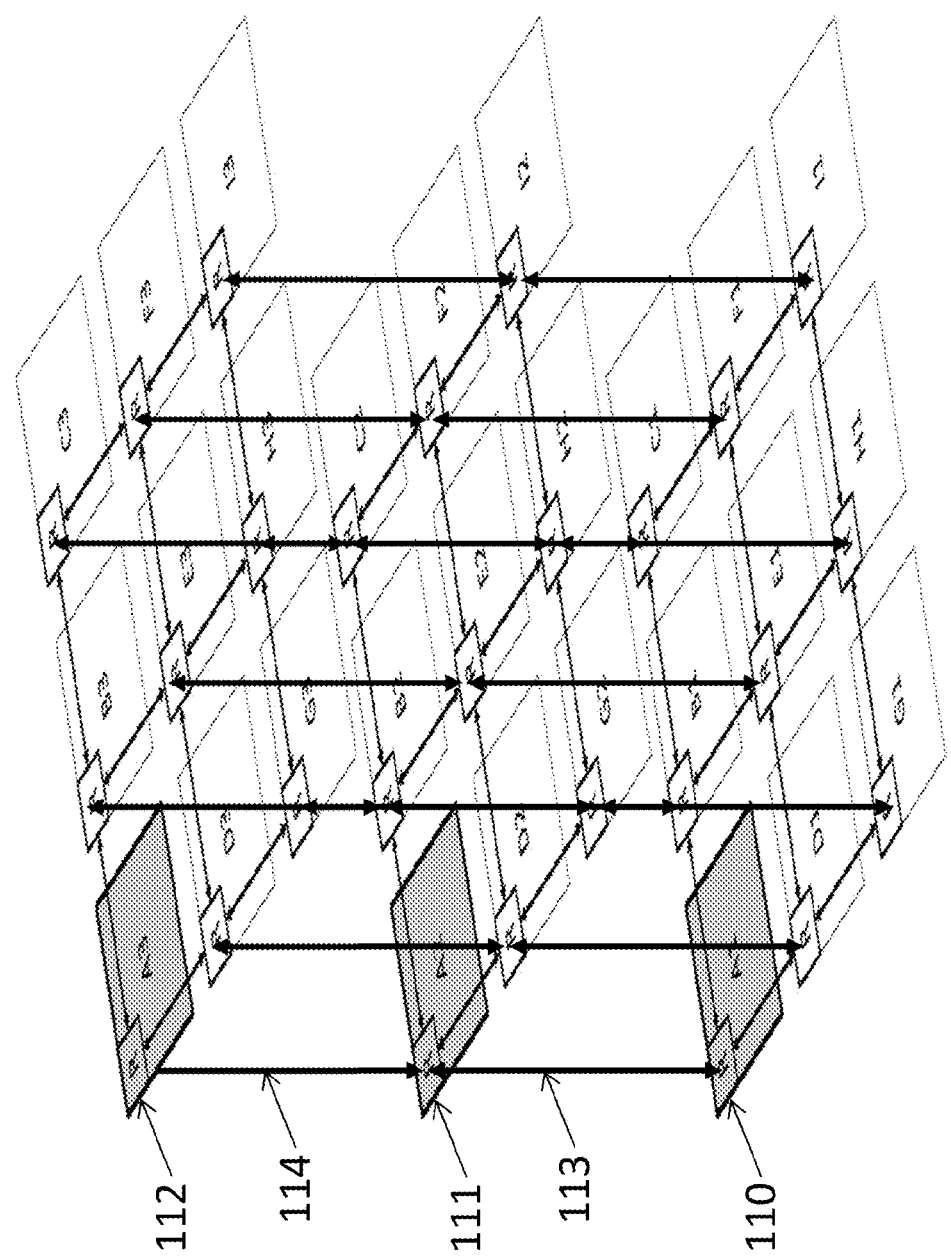
Figure 2A:
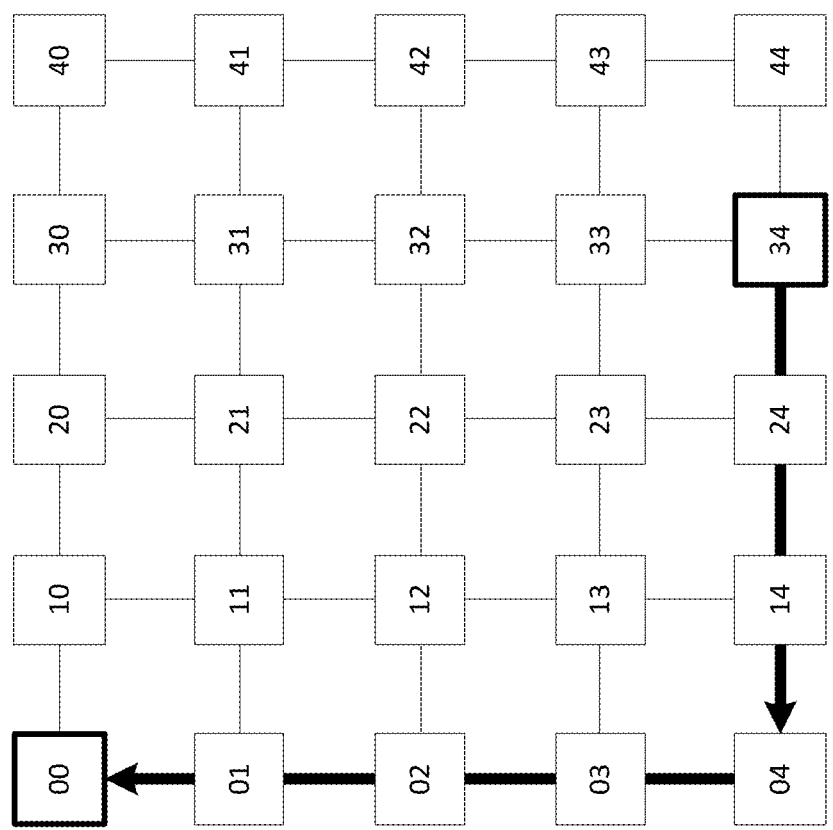
FIG. 2(a) illustrates an example of XY routing in two dimensional mesh in a related art.
Figure 2B:
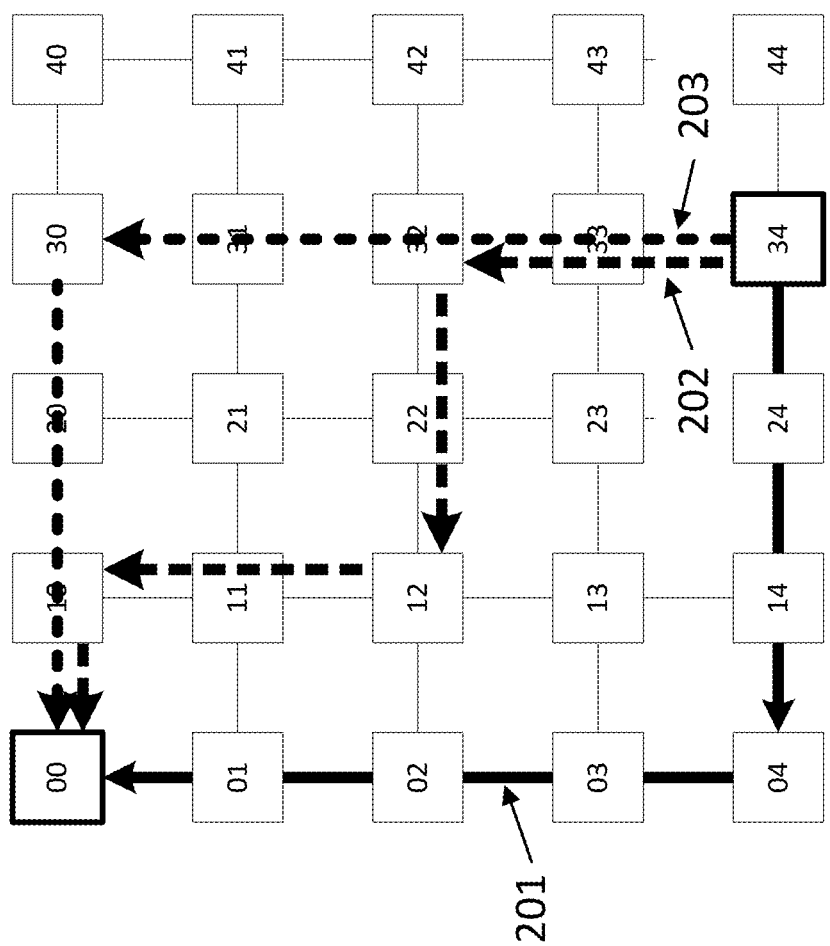
FIG. 2(b) illustrates three different routes between a source and destination nodes.
Figure 3A:
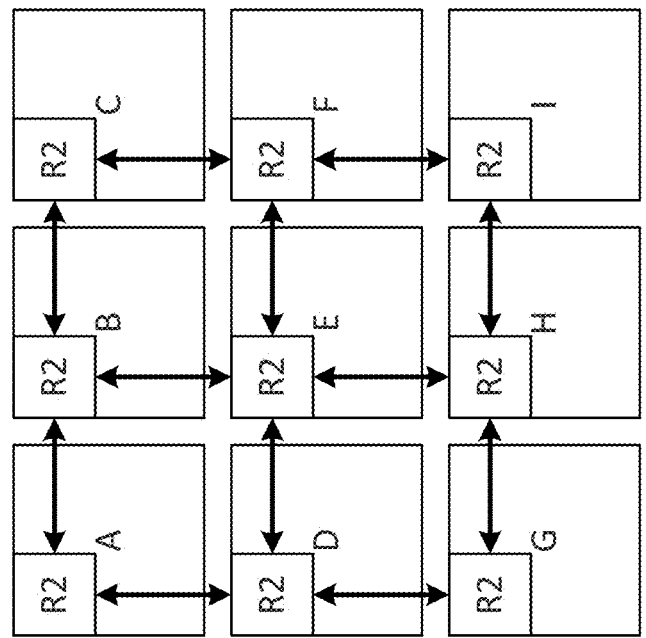
FIG. 3(a) illustrates an example of a related art two layer NoC interconnect.
Figure 3A:
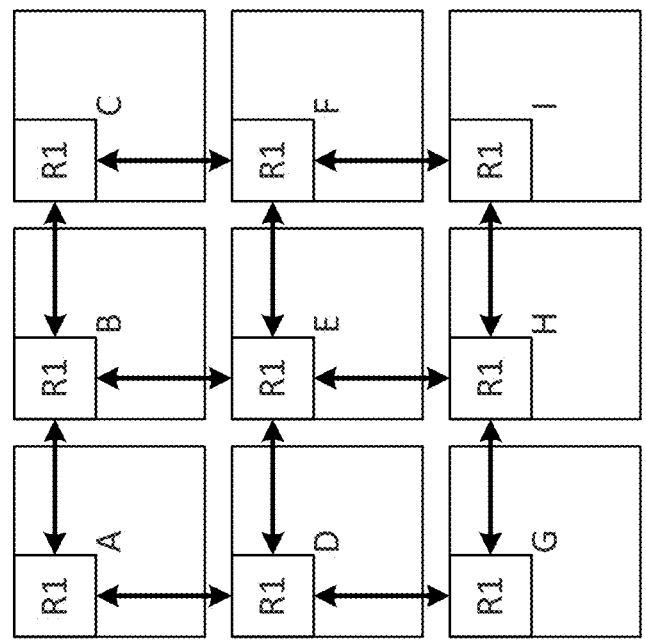
Figure 3B:
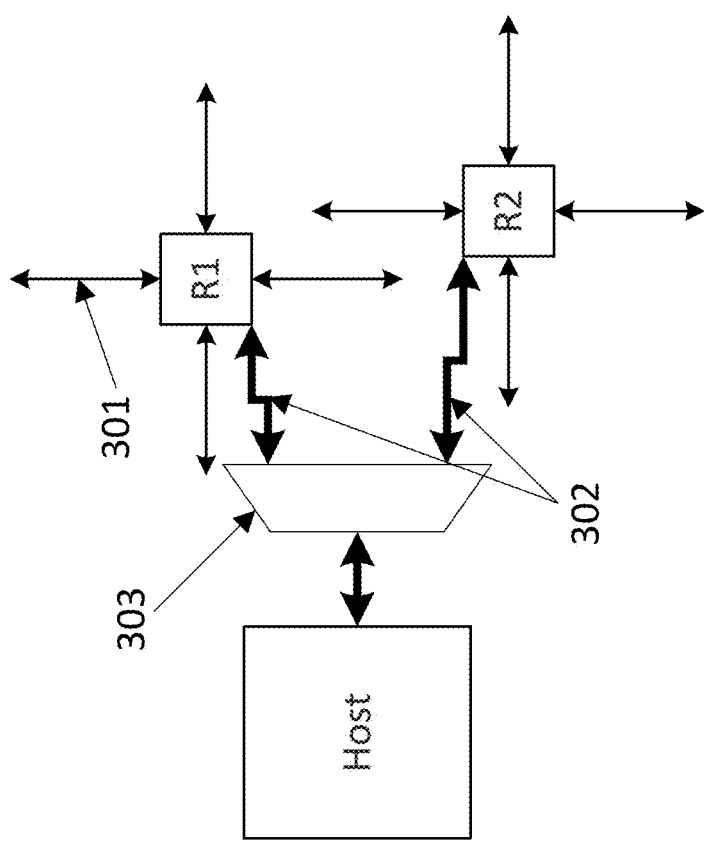
FIG. 3(b) illustrates the related art bridge logic between host and multiple NoC layers.

The following detailed description provides further details of the figures and example implementations of the present disclosure. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present disclosure.

Example implementations are directed to a configurable and programmable building block such as a router for use in NoC. The router in example implementations may be implemented in an application specific integrated circuit (ASIC) flow where it is configured statically based on specifications from a software layer and/or can be a hardware element that is dynamically customizable by a software layer, such as in a Field Programmable Gate Array (FPGA).

Aspects of the present disclosure may include a router for a NoC including a plurality of ports, each port configured with one or more virtual channels (VCs), wherein each VC is associated with a VC buffer and is configured to connected to a specified set of output port(s) or output VCs of the output ports based on a membership specified by a specification. In an additional aspect, the number of input and/or output ports and/or the number of VCs to be enabled/disabled for each input and/or output port can be specified by the specification, wherein size of each of the input VCs and/or size of each VC buffer can also be defined by the same or a different specification. In yet another additional aspect, router of the present disclosure can include a controller configured to upsize/downsize incoming flits received at one or more VCs of input ports and can further be configured to direct the flit to a configured/selected output port based on size ratio of input VCs and output VCs. In another additional aspect, router of the present disclosure can include a VC arbitrator configured to receive a flit having routing information, and arbitrate the flit/packet/message to perform output port selection based on the routing information.

According to one example implementation, a system/architecture of the present disclosure relates to a router for a Network on Chip (NoC), wherein the router includes a plurality of ports, each of the plurality of ports configured with one or more virtual channels (VCs), each of the one or more VCs associated with a buffer, each of the one or more VCs configured to connect to specified one or more other ports or VCs of the plurality of ports based on a membership specified by a specification, wherein a number of the plurality of ports and a number of the one or more VCs for the each of the plurality of ports is specified by the specification. According to one example implementation, size of each of the one or more VCs and size of the buffer can be specified by the specification. According to another example implementation, connectivity between each of the one or more VCs can be specified by the specification. According to another example implementation, one or more VCs may operate in different clock domain as specified by the specification.

According to one example implementation, a router of the present disclosure can further include a controller, wherein the controller can be configured to upsize or downsize a flit received at an input one of the one or more VCs and directed to an output one of the one or more VCs based on a size ratio of the input one of the one or more VCs and the output one of the one or more VCs. Router can further be configured to receive a packet at one of the one or more input VCs of one of the one or more input ports including a first set having first information for arbitration of the packet and second information for routing of the packet, arbitrate the packet and upon winning the arbitration, perform output VC and output port selection of one of the plurality of output VCs and output ports from the first information, calculate a second set having first information and second information for arbitration and routing of the packet at next NoC router using the first and second information, and finally forward the information along with the packet to the next NoC router. According to one example implementation, the first information of the packet can be indicative of the output VC and output port at a router and second information of the packet can be indicative of one or more turns at one or more routers of the NoC.

According to another example implementation, each of the one or more VCs can be associated with a Quality of Service (QoS) specified by the specification, wherein the router can be configured to conduct arbitration based on the QoS of the one or more VCs. Each of the one or more VCs can be associated with a clock domain specified by the specification, where the router can be configured to facilitate clock domain crossing logic for the one or more VCs.

According to another example implementation, the router can be configured to facilitate independent flow control for each one of the plurality of ports that is connected to another router port or an agent of the NoC. The router can be configured with flow control information from the specification to facilitate independent flow control between each one of the plurality of ports of the router and the corresponding another router port or NoC agent connected to the port. The router can further include an output buffering stage for one or more of the plurality of ports specified by the specification.

In another example implementation, the router can include a pipeline with one or more stages for one or more of the plurality of ports, the one or more stages and the one or more of the plurality of ports specified by the specification. The router can also be configured to, for each arbitration operation, transmit a number of flits from the one or more input VCs of ones of the plurality of input ports to one or more output VCs of ones of the plurality of output ports, wherein the number of flits are specified by the specification.

According to another example implementation, NoC of the present disclosure can be constructed by a software layer by configuring the one or more of the plurality of routers with information from the specification and connecting one or more of the plurality of ports of the one or more of the plurality of routers to one another or to one or more agents of the NoC, and further configuring the one or more of the plurality of routers by a software layer with information to facilitate routing of packets between NoC agents.

Aspects of the present disclosure may further include a semiconductor device configured with a NoC generated from a specification, wherein the device includes one or more hosts and a router including a plurality of ports, each port configured with one or more virtual channels (VCs), wherein each VC is associated with a VC buffer and is configured to connected to a specified set of output port(s) or output VCs of the output ports based on a membership specified by a specification. In an additional aspect, the number of input and/or output ports and/or the number of VCs to be enabled/disabled for each input and/or output port can be specified by the specification, wherein size of each of the input VCs and/or size of each VC buffer can also be defined by the same or a different specification. In yet another additional aspect, a router of the present disclosure can include a controller configured to upsize/downsize incoming flits received at one or more VCs of input ports and can further be configured to direct the flit to a configured/selected output port based on size ratio of input VCs and output VCs. In another additional aspect, router of the present disclosure can include a VC arbitrator configured to receive a flit having routing information, and arbitrate the flit/packet/message to perform output port selection based on the routing information.

Figure 4:
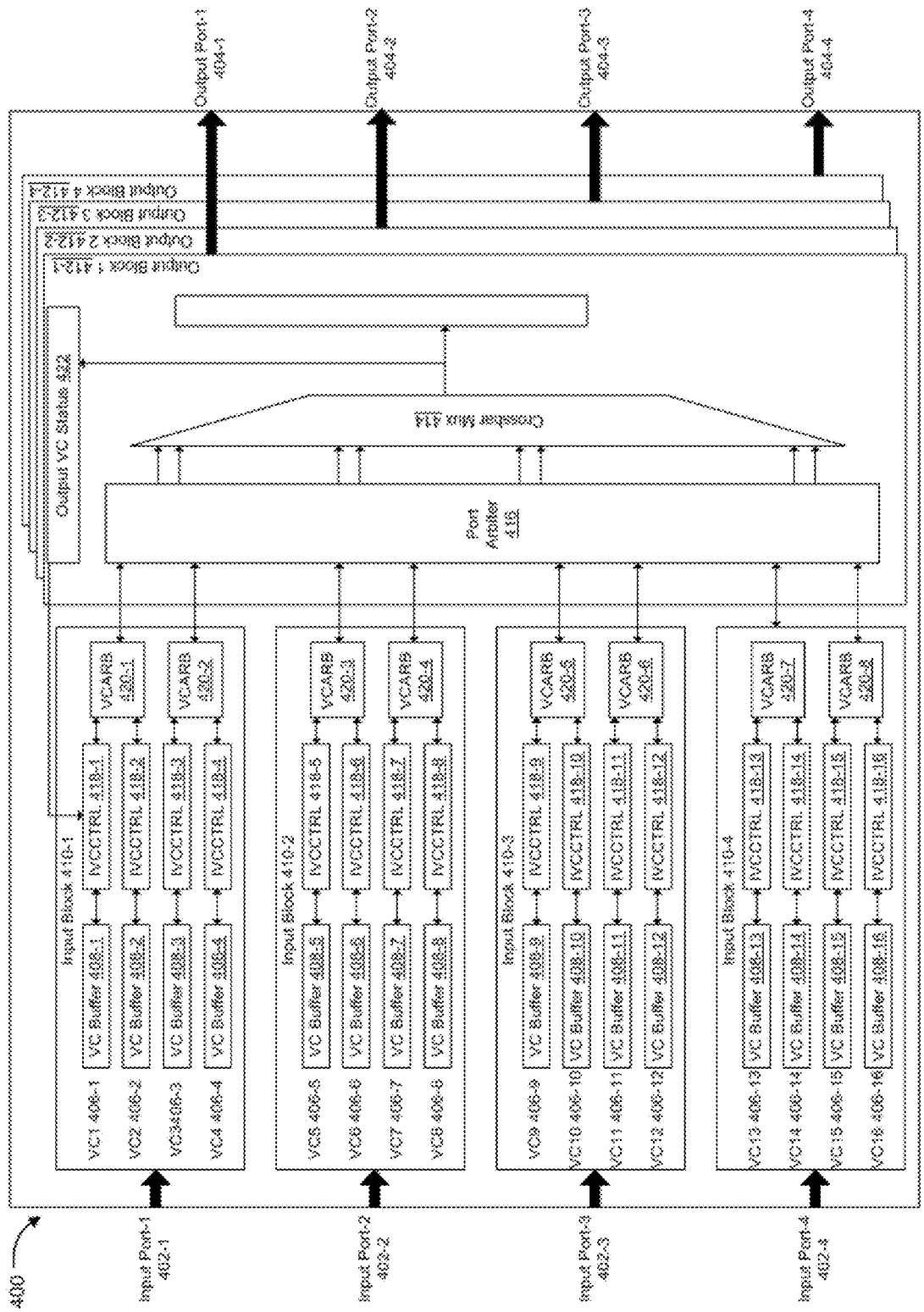
FIG. 4 illustrates an example implementation of a router in accordance with an example implementation of the present disclosure.

FIG. 4 illustrates an example implementation of a router 400 in accordance with an example implementation of the present disclosure. As illustrated, in an example implementation, NoC router 400 can have any number of input ports such as Input Port-1 402-1, Input Port-2 402-2, and so on, collectively referred to as input port(s) 402 hereinafter, and output ports such as Output Port-1 404-1, Output Port-2 404-2, and so on, collectively referred to as output port(s) 404 hereinafter as can be specified and configured by a software layer. Further, each input port 402 can have a configurable number of virtual channels (VC) such as VC1 406-1, VC2 406-2, VC3 406-3, and VC4 406-4 for Input Port-1 402-1, collectively referred to as virtual channel(s) 406 hereinafter, with each VC having a corresponding VC buffer 408 of varying size and depth. VC buffer 408 can be used for implementing functions including, but not limited to, clock domain crossing.

In an example implementation, VCs 406 and buffers 408 thereof can be configured in one or more input blocks such as 410-1, 410-2, 410-3, and 410-4, collectively referred to as blocks 410 hereinafter, wherein each input block 410 can correspond to an input port 402. For instance, input block 410-1 corresponds to Port-1 402-1, and input block 410-2 corresponds to Port-2 402-2, and so on. Router 400 can further include a plurality of output blocks 412-1, 412-2, 412-3, and 412-4, collectively referred to as output blocks 412 hereinafter, where each output block 412 can correspond to respective output ports 404. In an example implementation, router 400 can be constructed as such parameterized input blocks 410 and/or output blocks 412 that are conditionally instantiated depending on whether the corresponding input port 402 and/or output port 404 parameter is enabled or disabled.

In an example implementation, one or more of the VCs 406 of one or more input ports 402 can be enabled and/or disabled by the software layer. NoC router 400 can also be configured to conditionally instantiate input blocks 410 and/or output blocks 412 depending on whether the corresponding input/output port parameter is enabled or disabled. In another implementation, within the input ports 402 and/or output ports 404, a virtual channel (VC) specific logic can be incorporated in dedicated modules that are instantiated based on the VC enable/disable parameters for the input/output ports. In an example implementation, one or more cross bar multiplexers such as 414 and arbitrators/arbiters such as 416 can also be configured in the router 400 based on the programmed/configurable parameters from the software layer to indicative connectivity through the router 400. In another example implementation, cell area of router 400 can be dominated by registers contained in the VC buffers 408 on each input port 402. Each VC buffer 408 may have its own size (width). Furthermore, any such construction of number/size/type/configuration of input port(s) 402, output port(s) 404, VC(s) 406, VC buffer(s) 408, among other elements of the proposed router 400 can be configurable and is completely within the scope of the instant disclosure.

In another example implementation, each VC 406 can have a corresponding virtual channel controller (IVCCTRL) 418 (such as 418-1, 418-2, 418-3, . . . , and 418-16) configured to handle one or more of processing of flits as and when they are received, enable route computation, enable width resizing, among other desired functions. Each input block 410 can further include one or more virtual channel arbitrator (VCARB) 420 (such as 420-1, 420-2, 420-3, . . . , and 420-8) configured to conduct arbitration on flits forwarded by appropriate/applicable/corresponding virtual channel controllers 418. In an example implementation, a membership list of virtual channels 406 can be created for each output port 404, wherein groups of virtual channels 406 can be included in a membership for specified output ports 404. For instance, for Output Port-1 404-1, membership of virtual channels allowed to use the port can be selected from some VCs 406 of Input Port-1 402-1 and some VCs of Input Port-4 402-4 (e.g. VC0 406-1 of Input Port-1 402-1 and VC2 406-14 of Input Port-4). Further description is provided with respect to FIG. 5.

Figure 5:
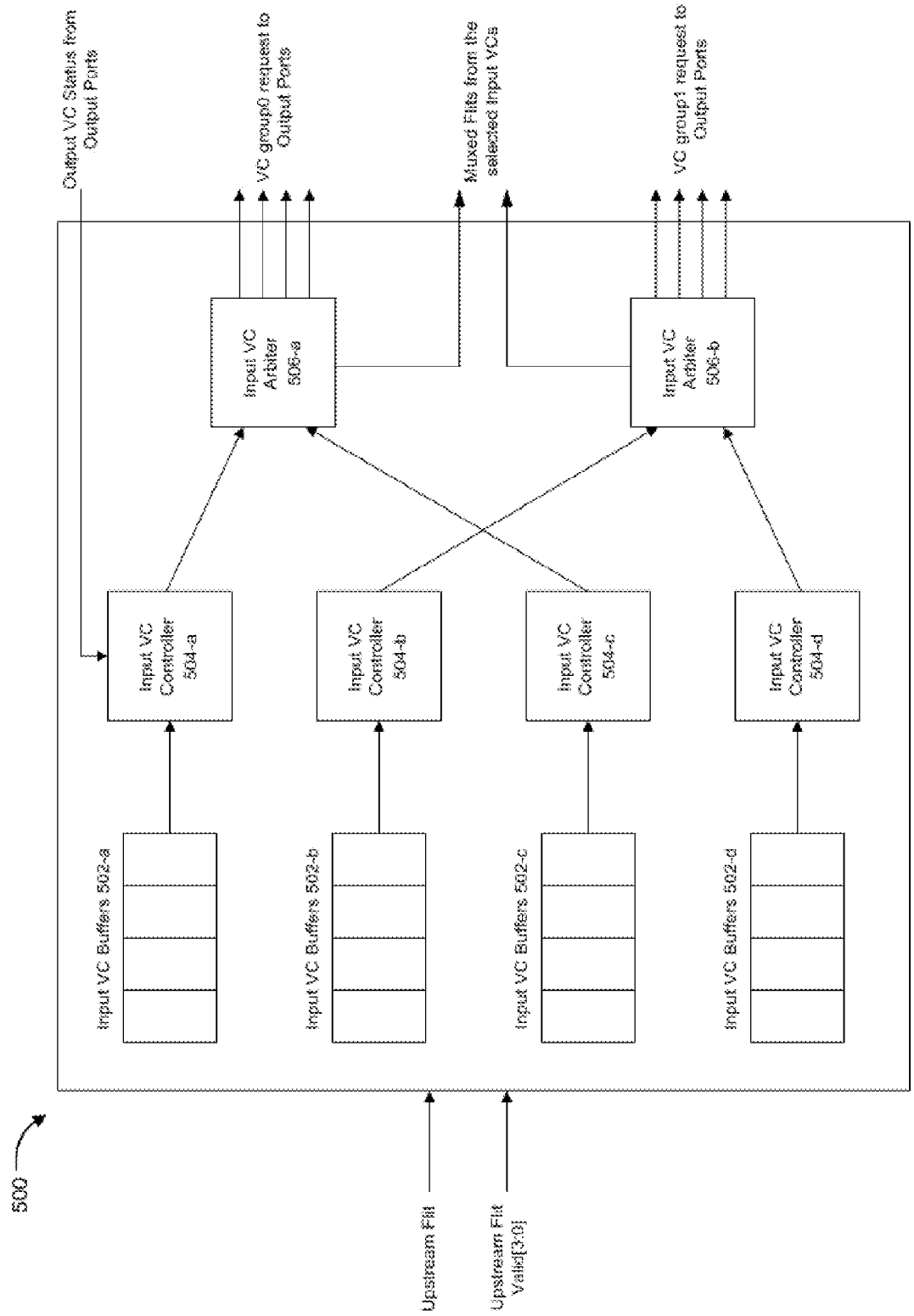
FIG. 5 illustrates an example implementation of input block of a router in accordance with an example implementation of the present disclosure.

FIG. 5 illustrates an example implementation of input block 500 of router 400 in accordance with an example implementation of the present disclosure. The router may include plurality of input ports, each port having one or more VCs with associated VC buffers 502-a, 502-b, 502-c, 502-d, collectively referred to as VC buffer(s) 502 hereinafter. Such buffers 502 can have varying sizes and all such changes in configuration/construction are within the scope of the instant disclosure. Input block 500 can further include VC controllers 504-a, 504-b, 504-c, 504-d, collectively referred to as VC controller(s) 504 hereinafter, wherein each VC controller 504 corresponds to a VC buffer 502, and is configured to perform functions including but not limited to, width resizing and route computation. In an example implementation, each input block 500 can further include one or more VC arbiters/arbitrators 506 for providing arbitration between VCs.

According to an example implementation, each VC on an enabled input port has a dedicated VC buffer 502, where incoming flits are received. Buffer holding control fields of the flit can be a pre-fetch First In First Out (FIFO), where head of the FIFO can be registered. In another implementation, VC buffers 502 can be implemented by using flip-flops or any other circuit. Furthermore, a software layer can be used to configure depth of the VC buffers 502, wherein an upstream router can have credits for a VC depending on the depth of the corresponding downstream input VC buffer 502. For supporting multiple clock domains, an asynchronous mode FIFO can act as a buffer to decouple input port clock from the core clock of the router. Credit synchronization can also happen in the VC buffer 502.

In an example implementation, each input VC on an input port has a VC controller 504 to facilitate flow control. In operation, a VC controller 504 can look at a valid head flit of the buffer, and use the output field to determine output port that the flit is destined for. Before forwarding the flit to the intended output port, the output port's VC credit availability and ready status (whether currently held by another input port) can be checked from the output VC status block (422 of FIG. 4). Barrier state of the output VC can also be checked to confirm if the output VC can accept the head flit type. If the input VC flit qualifies to participate in arbitration to get access to the output port, a request for that output port can be asserted to the VC arbiter 506, 504 can also maintain locking of the output port's VC once it has acquired it. This allows the input VC to transmit all of the body flits of the packet once it wins arbitration with the Start Of Packet (SOP) flit.

In another example implementation, a VC can upsize or downsize packets/messages/flits within certain ratios while sending them to the corresponding VCs on the output ports. For upsizing, an accumulator of appropriate size can be used. Flits can be read from VC buffers 502 into the accumulator such that when the head flit in the VC buffer is an End of Packet (EOP) or is the last flit for upsizing, the VC is considered ready for output arbitration. When downsizing, a flit remains at the head of the VC buffer and participates in arbitration multiple times. Each time arbitration is granted, a chunk of the flit is sent out to the output port having smaller link. In implementation, the flit can be unloaded from the buffer when the last valid chunk is sent out. In another implementation, input block 500 can also be configured to handle EOP and word count computation that is related to resizing.

In the example depicted in FIG. 5, input block 500 can be employed to achieve speed up on the input side of the switch. Out of four available VCs on each input port, two are selected to improve probability of matching with available output ports and transmitting a flit out. Two parallel 2:1 input VC arbiters 506 can be used to select one VC each in odd VC group (1, 3) and even VC group (0, 2). In an example implementation, priority arbitration policy is used, and if the two VCs have same priority, round-robin arbitration can be performed. The arbitration policy or any other parameter to be used by the input VC arbiters 506 can also be configured/adjusted by the software layer. Other possible methods of selecting two out of four VCs can also be implemented.

Further, other implementations may select more than two VCs from amongst the number of VCs on the input port.

In an example implementation, data from the selected VC buffer in each group can also multiplexed out. Each input VC can request any of the output ports other than itself as a flit cannot be sent back on the arriving port. Depending on the number of active VCs on the input port, the input VC arbiter 506 can be instantiated or removed depending on the desired implementation. For example, if only one VC is active in a VC group, arbitration is not required for that group. Input VC arbiter 506 also demultiplexes the output arbiter grant received for a VC group to the selected VC within that group. This grant can be used to unload the flit from the input VC buffer and send credit increment upstream for that VC.

Figure 6:
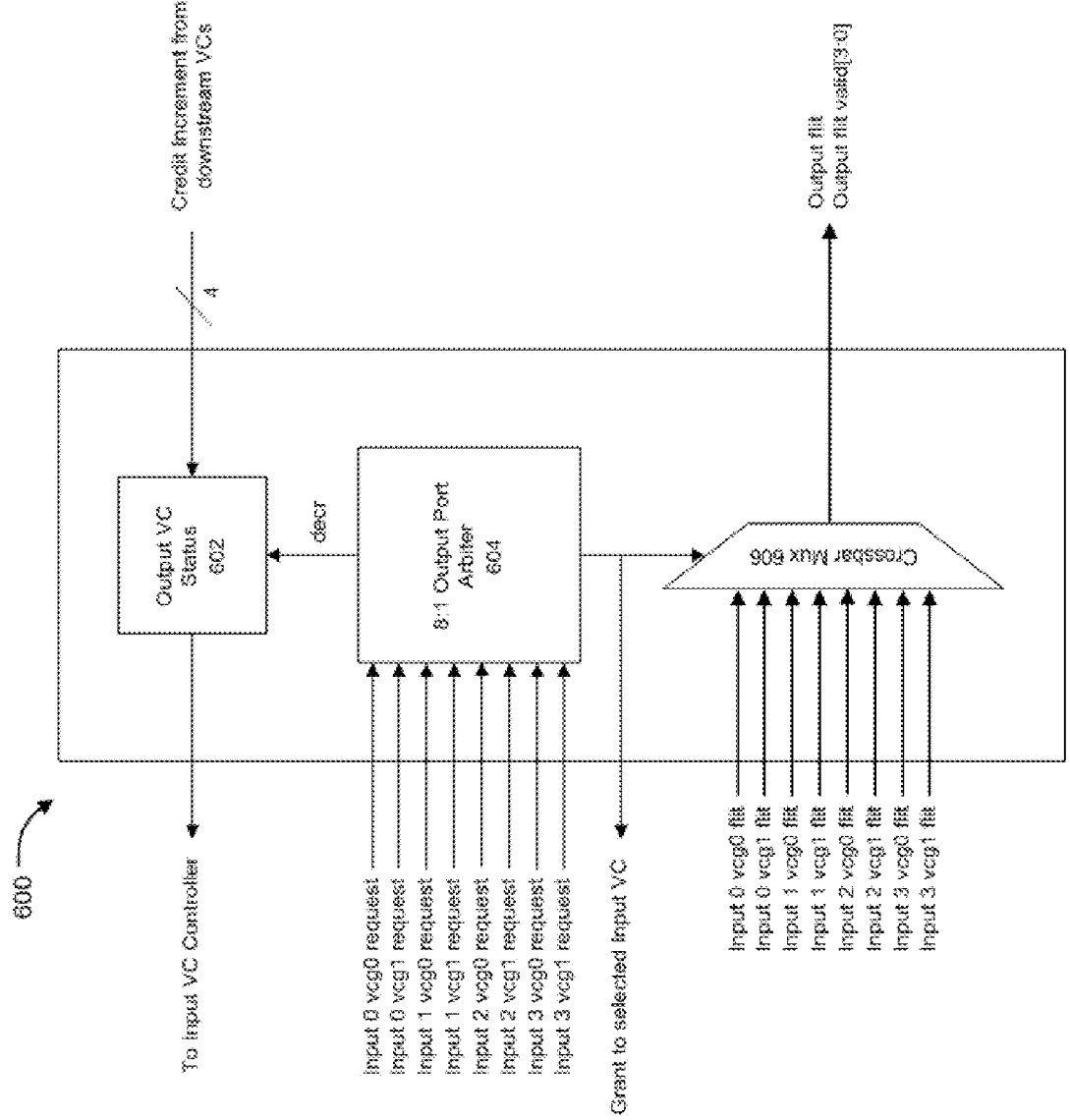
FIG. 6 illustrates an example implementation of output block of a router in accordance with an example implementation of the present disclosure.

FIG. 6 illustrates an example implementation of output block 600 of a router in accordance with an example implementation of the present disclosure. The output block 600 can include an output port arbiter 604, an output VC status block 602, and a crossbar multiplexer 606. In the example of FIG. 6, each output port receives up to two requests (from two selected VCs) from each of the five input ports except itself and performs an 8:1 arbitration. The active request with the highest priority can be selected and round-robin arbitration can be performed among requests with equal priority. In an example implementation, output port arbiter 604 can handle dynamic priorities of the flits as the VCs selected at the input can have different priorities. The selected input port and VC group can be indicated to the crossbar multiplexer 606 for the data path. Parameters of the output port arbiter 604 can be configured by the software layer.

In an example implementation, output VC status block 602 can maintain credit status of all VCs for an output port. Credit increment signals are received from the downstream router and credit decrement signals are locally generated when an input port sends a flit to the output VC. The output VC status block 602 also maintains locking status of a VC to an input port for the entire duration of a packet. This is because, on an output port, flits from different input ports can be interleaved across different VCs, but within a VC complete packets are transmitted from the allotted input port. The VC status block 602 can also maintain barrier/normal state to enable corresponding type of flits from the corresponding input VCs. In another example implementation, crossbar 606 of the router can be provided as a 8:1 one hot multiplexer for each port. Multiplexer selection can be provided by the output port arbiter 604. These parameters can also be configurable by the software layer. In example implementations, the router, as described in FIGS. 4-6 is a configurable building block of a NoC router parameterized by a software layer.

Multiple unique router instances can be created by utilization of the software layer through customization. The software layer can configure several parameters of the router. VCs of any port can be enabled or disabled by the software layer. The software layer can further configure each VC such that the VCs can be upsized and downsized. According to one example implementation, router to router communication occurs over a pair of receiver (RX) and transmitter (TX) interfaces, wherein per-port signals can be point-to-point and can be pipelined with register stages, provided that the credits and the FIFO sizes are adjusted accordingly.

In an example implementation, each output port's VC status block 602 maintains one counter for each input VC on the input port of the downstream block along that output.

The counter starts with the maximum credit, which is equal to the depth of the corresponding input VC buffer on the downstream block, wherein the counter can be decremented when a flit is sent out on that VC. The downstream router on the output side can return credits when a flit is read from its input VC buffer. Credit setting and FIFO depth can be adjusted by the software layer if pipeline stages are added to either the outgoing data or the incoming credit signal.

In example implementations of a NoC using the router, source routing may be employed to move packets in the NoC to their destination. A host bridge can attach routing information to each packet injected into the NoC. Each router can be configured to use the provided routing information and current output port information to pre-compute the output port on the next router along the path. The router can also modify the routing information to be used in the next hop router. The route processing can be pre-computed one hop early to keep this logic out of critical timing path. In example implementations, the routing information can be carried in the sideband channel for all the flits of a packet. The fields and description of routing information appear as provided below in Table I.

TABLE I

Routing information carried in flit sideband

| Field Name | Position | Description |
| --- | --- | --- |
| R1_COORD | 14:11 | X or Y coordinate of the first router where a turn is taken |
| R2_COORD | 10:7 | X or Y coordinate of the second router where a turn is taken |
| RDEST_COORD | 6:3 | X or Y coordinate of the destination router |
| DEST_PORT_ID | 2:0 | Port ID of the final destination is {H,S,W,E,N} |

Figure 7:
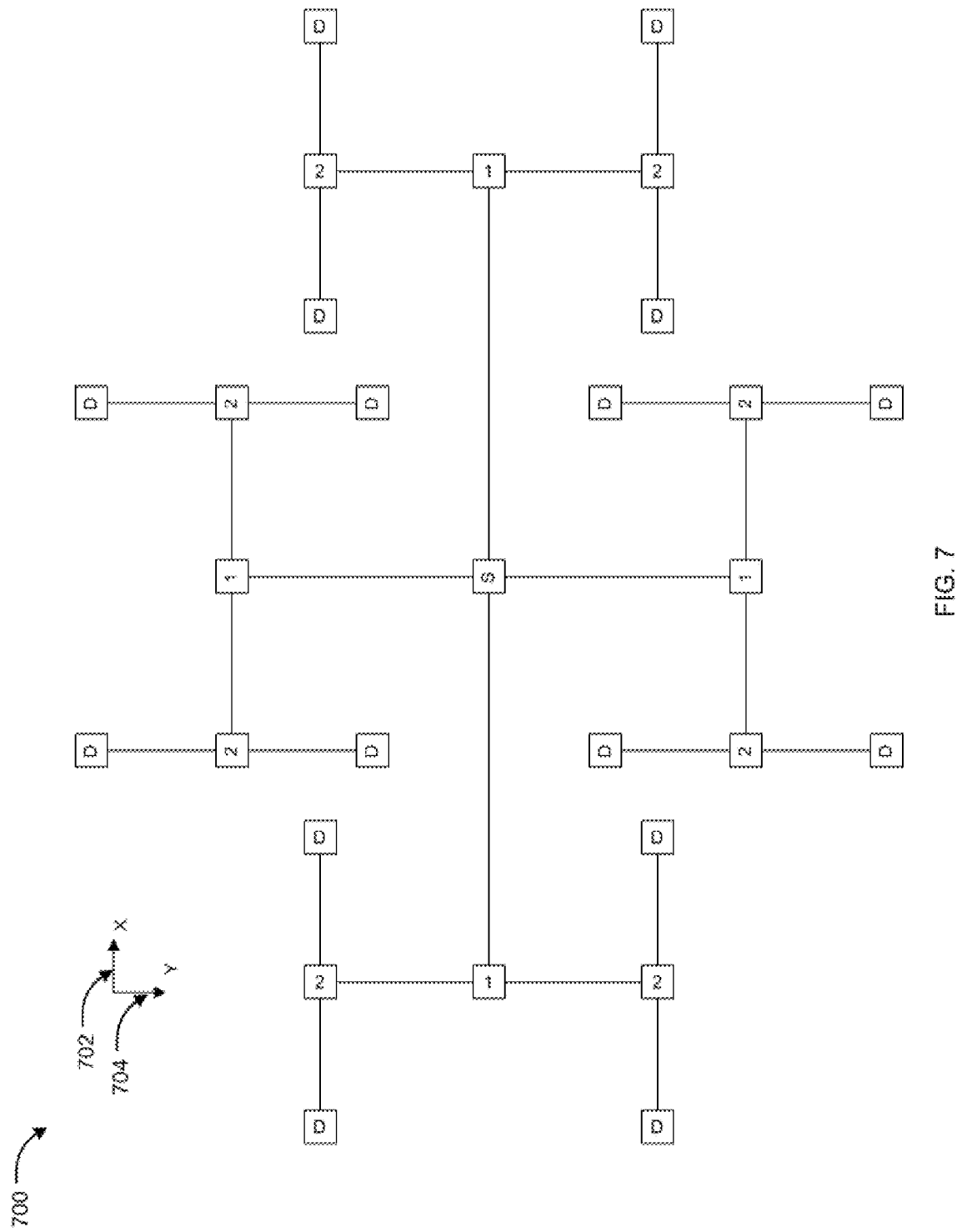
FIG. 7 illustrates an example of two turn routes taken on a mesh in accordance with an example implementation of the present disclosure.

FIG. 7 illustrates an example of two turn routes that can be taken on a mesh, in accordance with an example implementation. One turn can be taken along the X direction (702) and another can be taken along the Y (704). In an example NoC, a message from one host to another host may take two turns in going from the source to the destination. Example implementation therefore provides for a routing scheme 700 that facilitates routing with up to two turns.

Figure 8A:
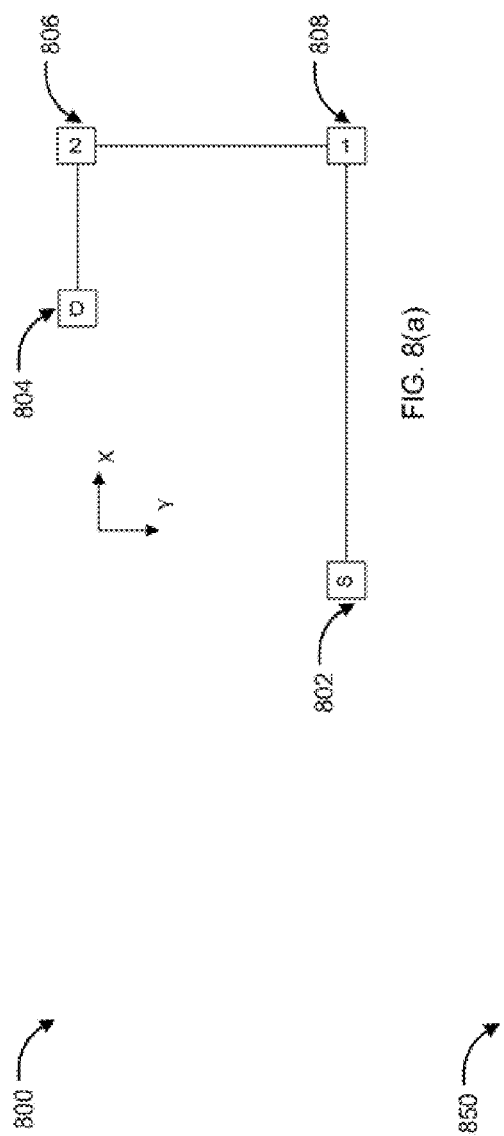
FIGS. 8(a) and 8(b) illustrate an example routing scheme for handling two turns in accordance with an example implementation of the present disclosure.
Figure 8B:
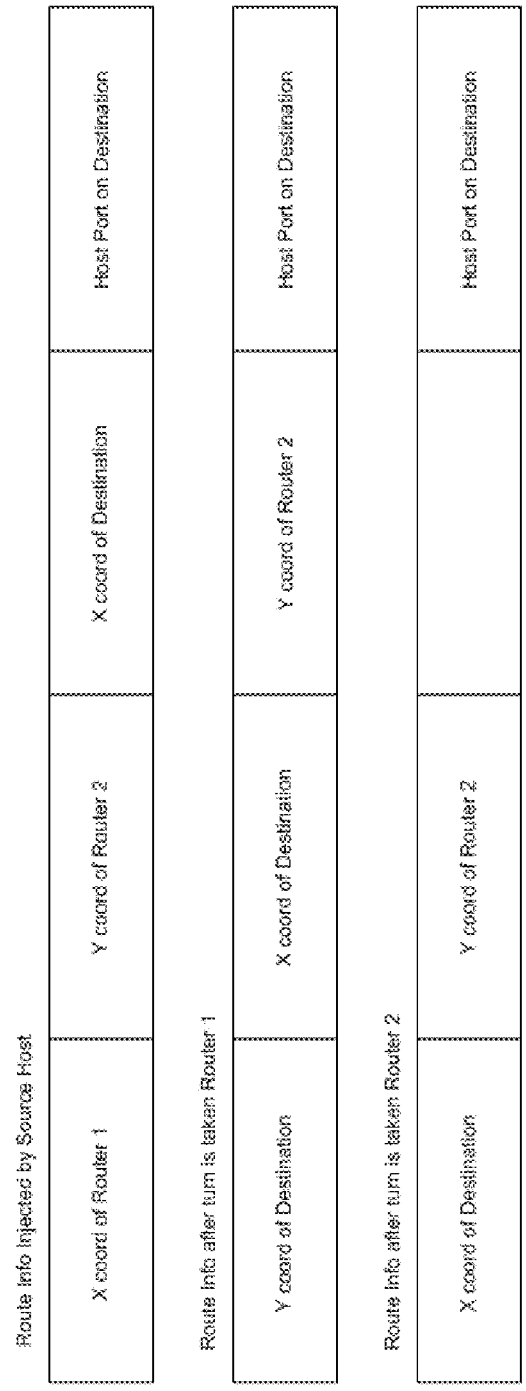

FIGS. 8(a) and 8(b) illustrate an example routing scheme 800 for handling two turns in accordance with an example implementation. Different routing scheme to be used by the router can be configured by the software layer. In an example, a source node 802 sends data packets to destination node 804, and along path to destination, takes two turn based on defined routing information 850. It takes first turn at router 808 and second turn at router 806. In the example of FIG. 8(b), route information 852 can be injected by the source node 802 using which the packets can reach the destination node 804. The side band includes coordinates in the first direction of the first router arbitrating the first turn, coordinates in a second direction of the second router arbitrating the second turn, coordinates of the destination router and the exit port at the destination. As illustrated in FIGS. 8(a) and 8(b), at every router where a turn is taken, coordinates in the side band information can be left shifted. The coordinate in the middle is copied into the rightmost location. This shift thereby allows the router to decide when a turn needs to be taken or when the final destination has been reached by looking at the leftmost two coordinates in the side band information.

In the example routing scheme, the destination router can be assumed to be reached when the left most (first) coordinate in the route info matches the router coordinate in the current direction (e.g. X-coordinate if going in the E or W direction, and Y-coordinate if going N or S) and the second coordinate in the route info matches the other coordinate (e.g. Y-coordinate if going in the E or W direction and X-coordinate if going N or S). The router determines that a turn may be needed when the first coordinate in SB matches the router coordinate in the current direction and the second co-ordinate does not match. Now depending on whether the second coordinate is greater than or less than the other coordinate, a turn is made (N or S if going in the E or W direction and E or W if going N or S). If the first coordinate doesn't match the router coordinate, the packet can continue in its current direction. The output port to which the destination host is connected on the last router can be contained as the right-most 3-bit field in the sideband info.

On a NoC, at a grid point, if the router doesn't have traffic exiting to a host port or if the number of links is such that no switching is required, the software layer can remove or skip these routers. The route computation logic can handle this using parameters from the software layer, which can explicitly program the coordinate of the next real router along the output ports of a given router. Pre-computation can still happen on the previous real router on along the path. It would be apparent to a personal skilled in the art that a router is utilized where a turn occurs.

Figure 9:
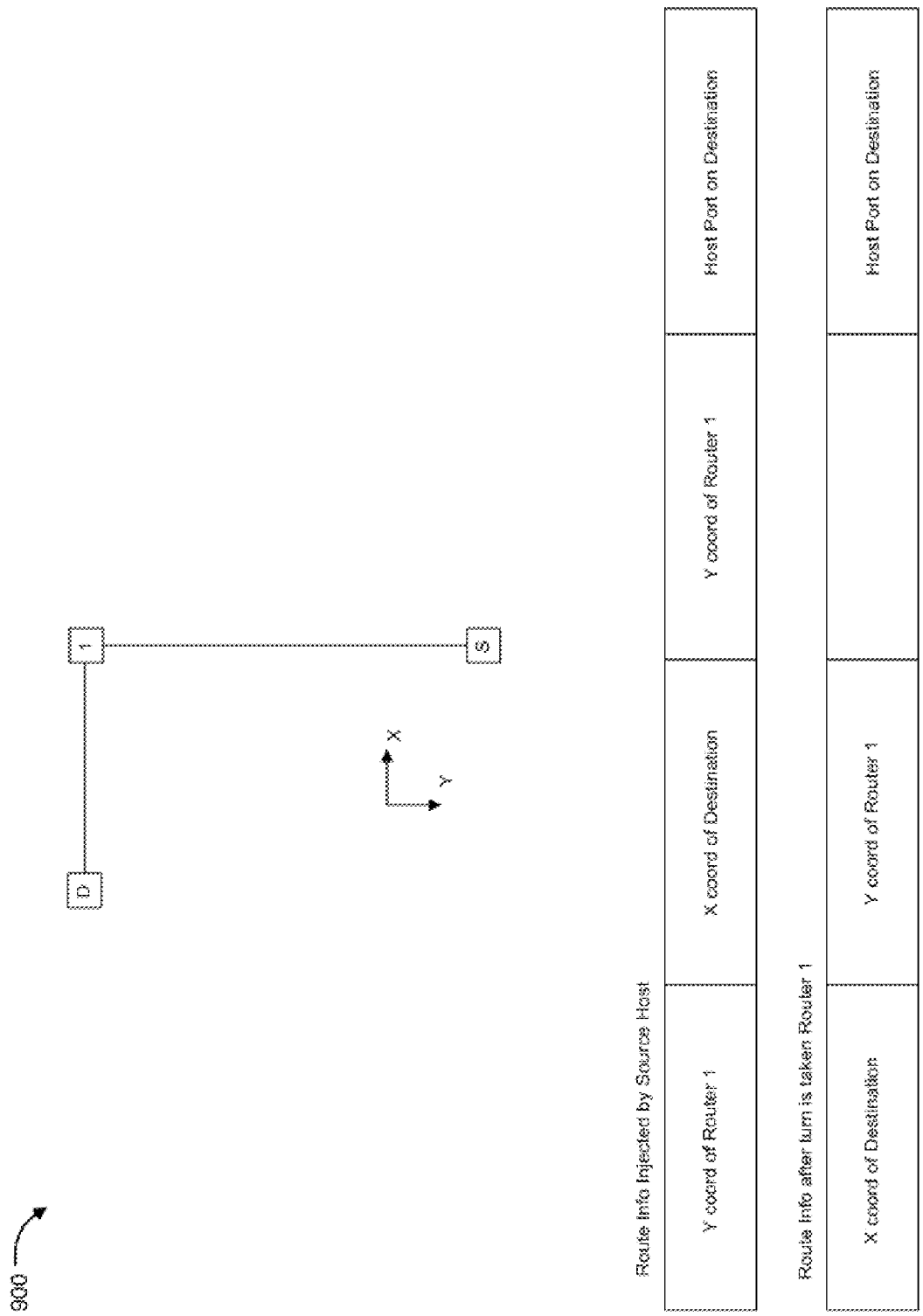
FIG. 9 illustrates an example routing scheme for handling single turns in accordance with an example implementation of the present disclosure
Figure 10:
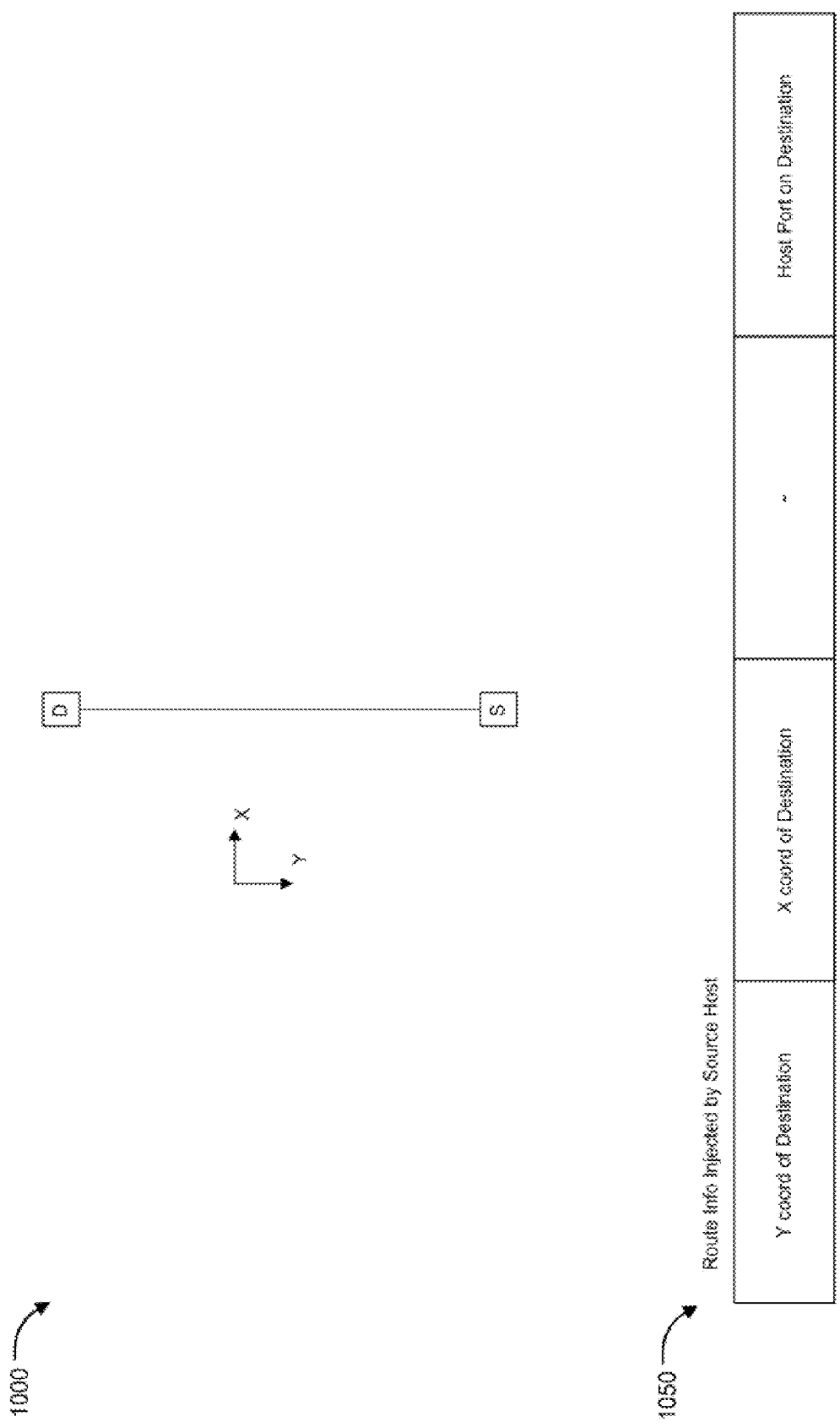
FIG. 10 illustrates an example routing scheme for handling no turns in accordance with an example implementation of the present disclosure.

FIG. 9 illustrates an example routing scheme for handling single turn 900 in accordance with an example implementation. FIG. 10 illustrates another example routing scheme for handling no turn 1000 in accordance with the example implementation. Implementations are based on similar schemes as described with respect to FIGS. 8(a) and 8(b).

Figure 11B:
FIGS. 11(a) and 11(b) illustrate an example of flit upsizing and downsizing, respectively, in accordance with an example implementation of the present disclosure.
Figure 11A:

FIGS. 11(a) and 11(b) illustrate an example of flit upsizing and downsizing, respectively, in accordance with an example implementation. Each input VC on every input port can send packets to the corresponding output VCs with a static width conversion ratio (e.g., 1x (3'b000), x/2 (3'b001), x/4 (3'b010), 2x (3'b011), 4x (3'b100)). The flits can be upsized and downsized.

For upsizing, depending on the ratio of the upsizing, the input VC can be configured to request for an output port if the number of flits required to construct the upsized output flit is ready in the accumulator, and if the VC buffer or EOP flit are available. Depending on desired implementation, sideband channel may not undergo the upsizing as the side band information can be common for all the merging flits, and the same can be attached to the upsized flit. The word count indicator with EOP flit can indicate the number of valid words in the last flit. Word count for the upsized end of packet flit can be computed appropriately. In the example shown in FIG. 11(a), if each input flit had two valid words and C was an EOP flit with one valid word, upsizing will be done with just the three flits. Word count of the upsized end of packet flit will be 2*2+1=5 words For downsizing, the output flit sized sections of the input flit at the head of the VC buffer can be transferred to the output port. The input flit can be unloaded from the buffer when the last section is sent out. For an end of packet input flit, the flit is unloaded when the last valid section as indicated by the word count is sent out. Word count of the output end of packet is also appropriately calculated. Depending on the desired implementation, sideband information may not be downsized and the same can be attached to the downsized output flit. Sideband information of the input flit can be replicated with every downsized flit to the output. As an example of word count calculation, consider that in the example of FIG. 11(b), each of the downsize flit can hold two words. If a packet flit at input had 7 valid words, the output downsize flits A, B and C each are non-EOP and have both words valid. EOP is marked with downsized flit D and word count is one.

Another example implementation may not require the words of a flit to be packed together. In such an implementation words count will be replaced by a vector indicating the valid words in a flit.

Figure 12:
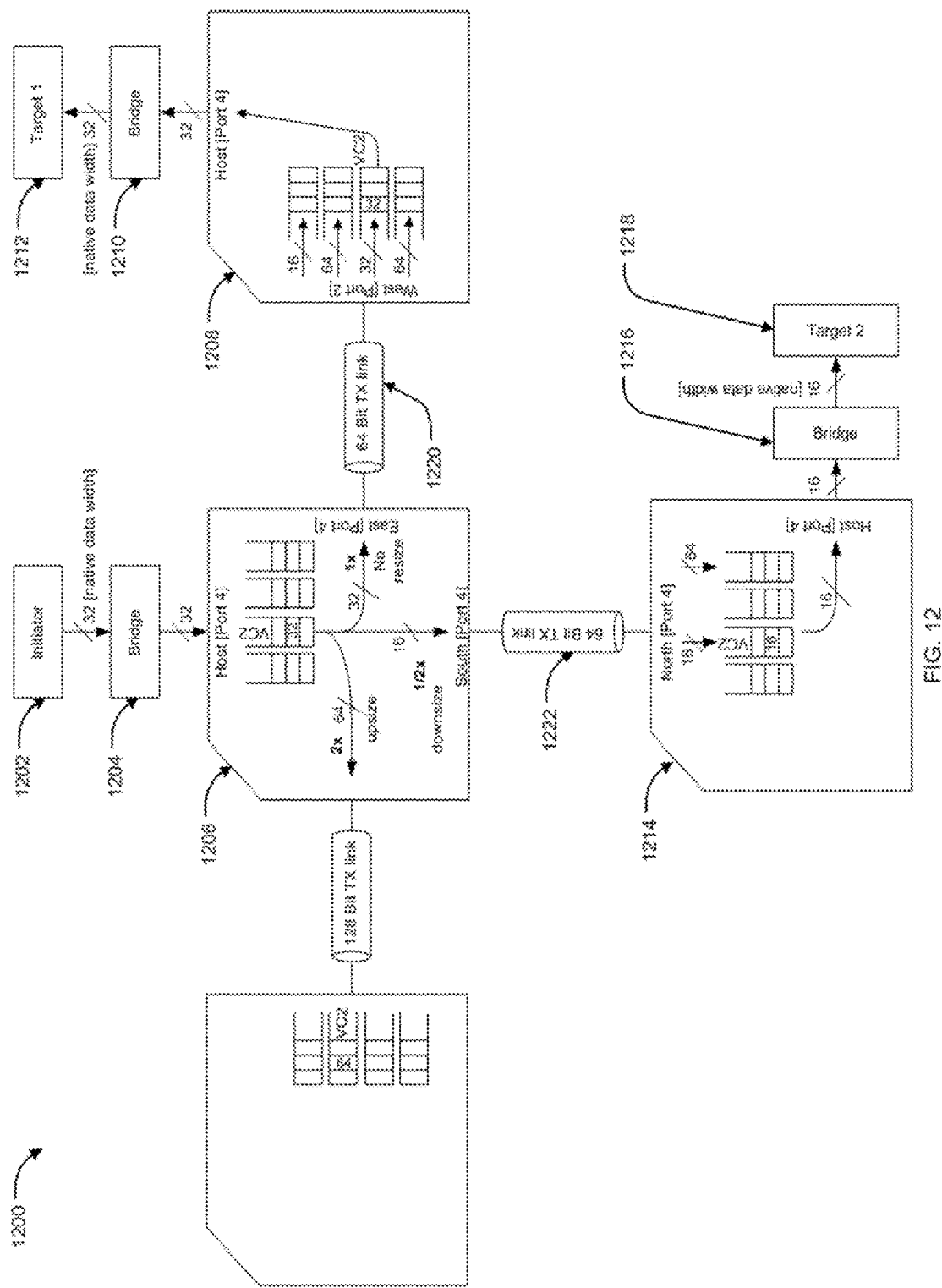
FIG. 12 illustrates an example of asymmetric width conversion in accordance with an example implementation of the present disclosure.

FIG. 12 illustrates an example of asymmetric width conversion, in accordance with an example implementation. There is a first agent or initiator 1202 that connects to router/bridge 1204 via a native 32-bit interface and transfers messages to two targets, namely Target 1 1212 and Target 2 1218, wherein the Target 1 1212 has a 32-bit interface, and the Target 2 1218 has a narrower 16-bit interface. The choices for width conversion are further explored in the table below assuming two routers 1206 and 1208 connected via a 64-bit wide physical channel 1220 to enable asymmetrically sized master and slave agents to communicate. The port connectivity may be represented as:

[Entry] 1206.Host→1206.East→1208.West→1208.Host [Exit]

Router 1206 connects to the master agent

Router 1208 connects to the slave agent

Depending on the desired implementation, native agent widths can be configured to not vary by more than 2x to keep the cases limited. In an example implementation, flits going from initiator 1202 to target 2 1218 can be downsized at router 1206 as the router 1206 and router 1214 are connected through a 16 bit interface 1222. In another example implementation, flits going from initiator 1202 to target 1 1212 can be upsized at router 1208 as the router 1206 and the router 1208 are connected through 64 bit interface.

Figures 13A, 13B:
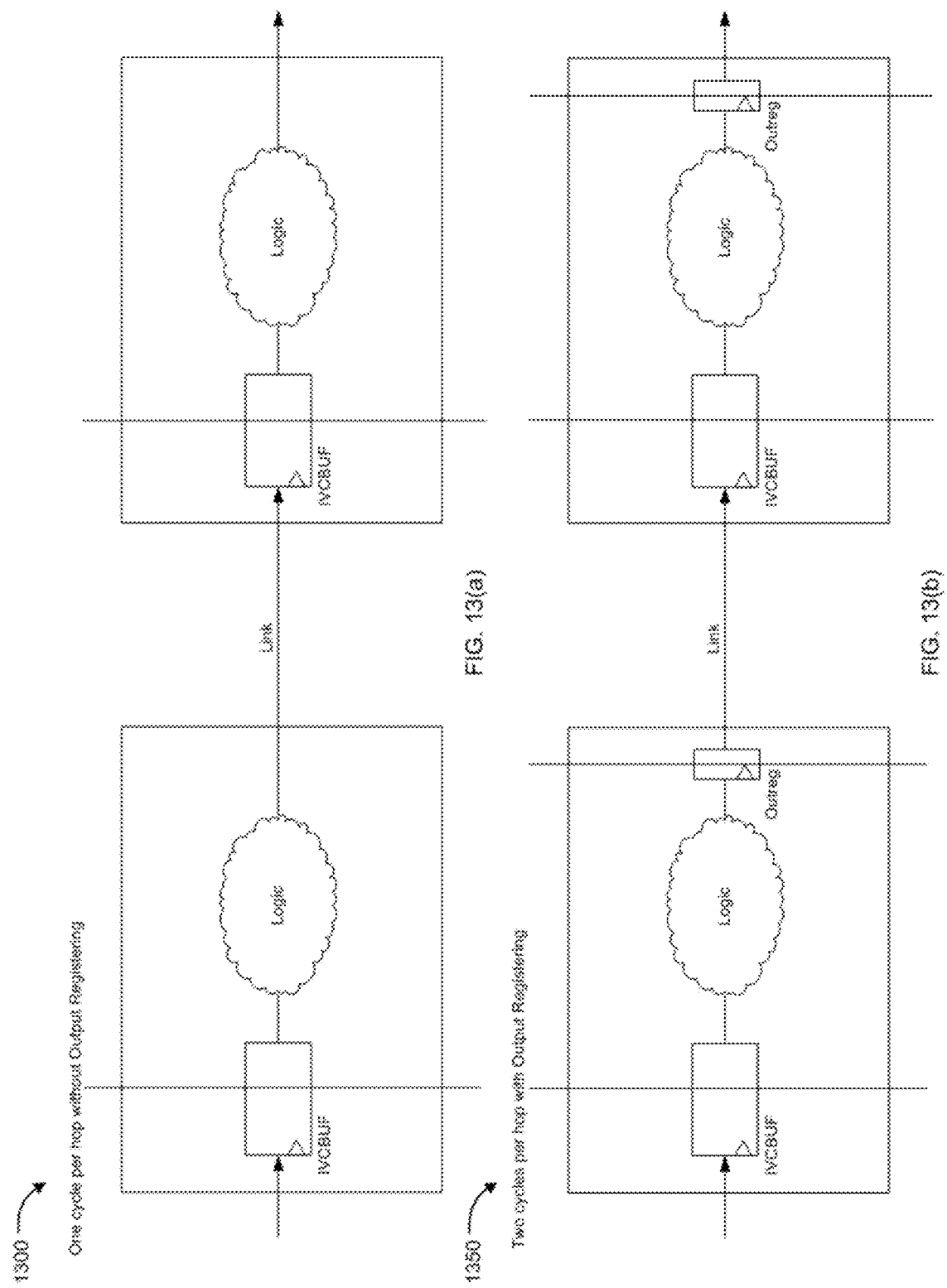
FIGS. 13(a) and 13(b) illustrate latency with one cycle and two cycle per hop, respectively, in accordance with an example implementation of the present disclosure.

FIGS. 13(a) and 13(b) illustrate registering with one cycle and two cycles per hop, respectively, in accordance with an example implementation. In example implementations, routers have an internal registering stage at the input VC buffers. Hence each router on a NoC route may add a minimum latency of one clock cycle. Internal processing within the router may require one complete clock cycle at frequencies around 1 GHz. If an additional clock cycle is needed to traverse the link from the output of a router to the next downstream block, output register stage may need to be added at the router output. This register would increase the total router latency to two cycles, with one cycle for traversing the physical link between routers and one cycle for the internal router logic.

According to one example implementation, proposed router of the present disclosure can be configured as a black box with a defined number of configurable parameters, which can be changed at run/design time to change the manner in which the router functions/behaves. Once an initial design/configuration for the router is created, the hardware (as an ASIC or in any other known architecture format) can be created to make a configurable router that can receive instructions through a software layer for re-configuration. According to another example implementation, router of the present disclosure can be configured as a building block for a NoC and can be statically parameterized to make the router unique for each instance in the NoC and have a configurable number of ports, VCs, buffers, controllers, at both the input and output sides.

According to another example implementation, each block can have 8 directional ports with each location of the NoC having a unique instance as dictated by the proposed software layer. As mentioned above, any element of the router including but not limited to the number of ports, number of VCs per port, presence of each VC in a port, or a combination of VCs within a port can be configured as desired, wherein some of them can be enabled and other disabled. For instance, a 8 port router can be configurable to change its working as a 5 port router, with hosts configured on North, East, South, and West positions of the router. Router can also be configured as a mesh (5 port) or as a ring router (3 port) or with no directions (such as router with 8 ports, each connecting to a host) acting as a cross bar, 2 ports, or any other number of ports. Router can also be configured to act as a pipeline (2 port).

In another example implementation, as mentioned above arbitration within the switch is configurable, wherein the arbitration can be based on priority of flits to be transmitted, characteristics/parameters of input ports/VCs, QoS parameters, weighted parameters, among other like attributes. In an example implementation, router configuration can also be implemented such that one or more routers are, during transmission, skipped on the NoC interconnect.

In yet another example implementation, one or more virtual channels (VCs) can be interleaved, where packets in different virtual channels can take different cycles on the physical link. VCs can therefore be interleaves or can be configured contiguous to each other, wherein a flit is passed through one or more of the VCs during every cycle. In yet another example implementation, packet of any size/format can be processed in the proposed configurable router.

In another implementation, output ports to which a VC can send traffic can be based on the membership of the output ports that the concerned VC has. Software of the present disclosure can configure the router to dictate a reduced membership vector so that VCs can be formed to send flits only through a defined number of specific output VCs/ports within the router. Such software, in an example implementation, can be stored in the router member can executed by the router processor.

In another example implementation a packet may be sent on an output VC that is different from the VC on which it arrived. Such input to output VC mapping may again be configured by the software layer to meet requirements which include but are not limited to deadlock avoidance in the resultant network. However, in example implementations, any factor can be utilized to facilitate the mapping, and does not have to include a direct one VC to one VC mapping, depending on the desired implementation. For example, one input VC can be associated with multiple output routers.

In another example implementation, VCs can be FIFO storage structures, wherein each VC can include a virtual processor, which determines the flit to be processed and the output port(s) through which the packet/flit can be transmitted. For each cycle, instead of one candidate, input block can allow selection of desired flit from amongst multiple candidates by means of arbitration. Therefore, instead of selecting one VC, two or more can be initially chosen, upon which arbitration is then performed to select the flit that is to be transmitted in that cycle. For instance, in case there are three input ports having three corresponding input blocks, each input port can select two VCs, each VC indicating two output ports to go to. Post receiving multiple flits at output, output arbitration can be conducted as each output port can only output one flit. Output port can therefore dictate which input port to instruct to send the flit by sending a grant message/flag. Selected VC on the input port side can then take the concerned flit and send it to the output port.

According to one example implementation, upsizing/downsizing can be performed by the proposed configurable router design, wherein using the router, width the links can be changed at runtime to enable different sections of the network to have different bandwidth, wherein the bandwidth can be dictated in the hardware. Router can therefore dictate the internal bandwidth (2x, ½x, 4x, ¼x), wherein virtual links can change their size as they go through the switching. Software can provision each router such that, for instance, during upsizing, each flit can be combined with other flits belonging to the same packet and sent together. Similarly, during downsizing, the flits can be split, which all ratios/settings can be defined by the software.

In yet another example implementation, ports of each router can also be configured based on their clocking domain as asynchronous ports and sync ports, wherein the software can specify the clocking domain of each VC, along with configuring the clocking type, physical behavior, among other settings.

Figure 14:
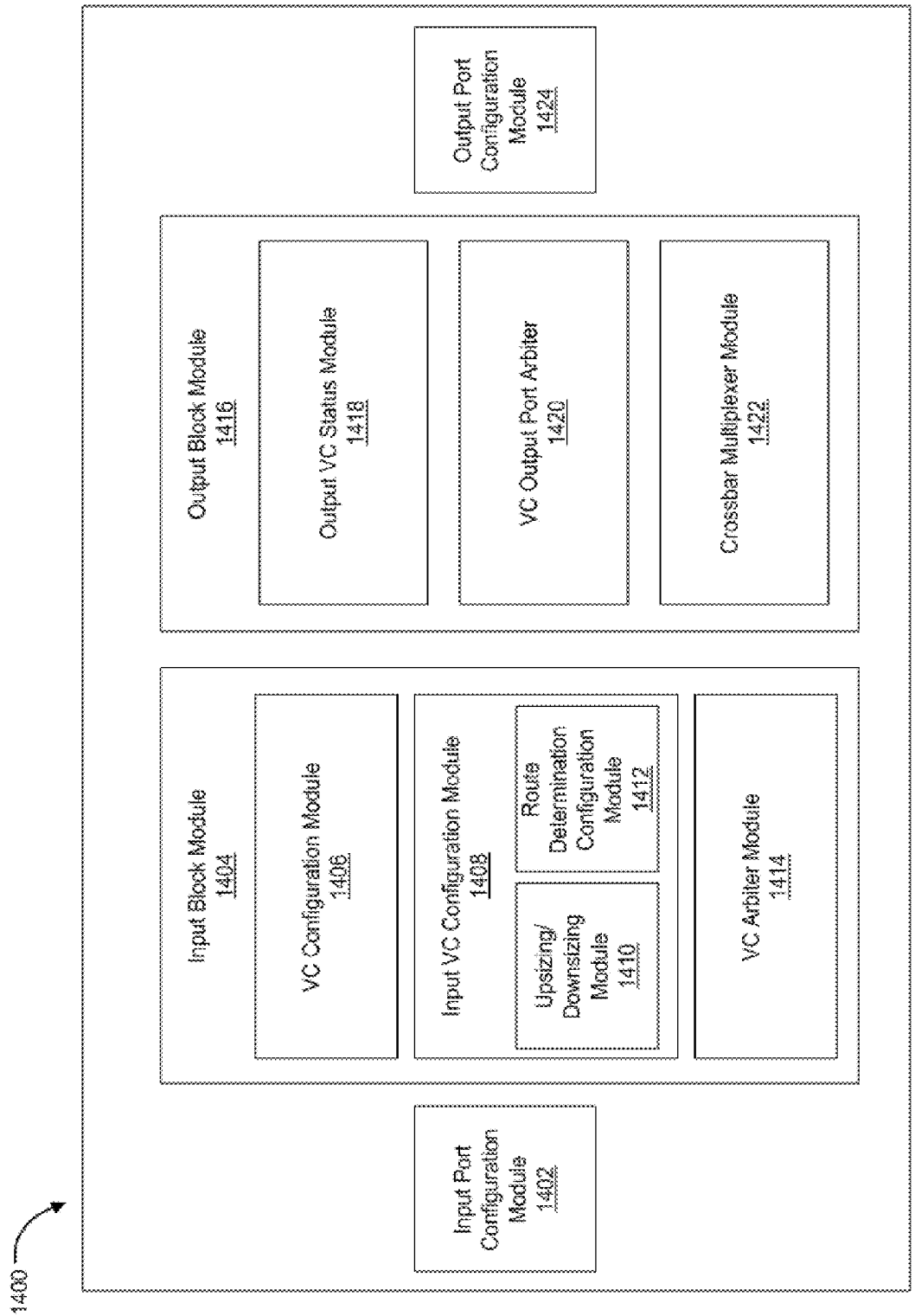
FIG. 14 illustrates example functional modules of software layer for implementing configurable NoC router in accordance with an example implementation of the present disclosure.

FIG. 14 illustrates example functional modules 1400 of software layer used for configuring NoC Router in accordance with an example implementation. According to one implementation, input port configuration module 1402 can be configured to enable change in the number/characteristics/function/construction/type/mode of input ports. NoC router of the present disclosure can include a plurality of ports, each of which can have a one or more virtual channels (VCs), wherein each VC is connected/associated with one or more output ports/output VCs based on a membership defined by a specification. Input port configuration module 1402 can therefore be configured to define/enable/disable the number of input ports used for communication with hosts.

In an example implementation, software layer of the present disclosure can further include a input block module 1404 having a VC configuration module 1406, an VC controller module 1408, and a VC arbiter module 1414. VC configuration module 1406 can be configured to enable/disable one or more VCs that are associated with the one or more input ports such that number of VCs that each input port has can be controlled. VC configuration module 1406 can further be configured to control size/characteristics/type/parameters of each VC along with VC buffer that corresponds to the VC in context.

In an example implementation, VC controller module 1408 can be configured to, using an upsizing/downsizing module 1410, upsize and/or downsize a flit received at an input VC and direct the flit to one or more output port(s) based on the membership that the concerned input VC has. According to one example implementation, the upsizing/downsizing can take place based on a size ratio of the input VC(s) and output VC(s). VC controller module 1408 can therefore further include a route determination module 1412 configured to determine the output ports to which an input flit has been to be routed. Module 1412 can therefore process route information provided by the host node in the flit and extract the destination node coordinates from the same. In an example implementation, module 1412 can be configured to dynamically change route information on the go. In another example implementation, module 1412 can be configured to use different route scheduling methods that can be configured by the software layer.

In another example implementation, VC arbiter module 1414 can be configured to arbitrate an incoming packet to perform output port selection based on information of VC/VC buffer/flit format, among other parameters. Module 1414 can further be configured to arbitrate a packet including routing information, wherein the routing information includes information indicative of one or more turns at one or more routers of the NoC. In another example implementation, module 1414 can be configured to incorporate QoS specified by a specification and arbitrate the packet keeping the QoS of one or more VCs in context. In an implementation, flit with highest priority will move first in the from the input block module 1404, wherein if all the flits are of same priority, module 1414 can be, for instance, configured to use FIFO principle.

In an example implementation, functional modules 1400 of the proposed software layer can further include, on output end of the NoC router, an output block module 1416 having an output VC status module 1418, a VC output port arbiter module 1420, and a crossbar/multiplexer module 1422. In an example implementation, the VC output port arbiter module 1420 can be configured to perform arbitration, such as 8:1 arbitration, to determine one or more of input port to be used in a defined cycle, VC to be used for the cycle, flit to be transferred to output port, output port to be used, direction of transmission, among other arbitration level decision explained with reference to 604 of FIG. 6.

In an example implementation, crossbar/multiplexer module 1422 can be configured to receive flits for transmission from the selected input port and VC group. Output VC status module 1418, on the other hand, can be configured to maintain credit status of all VCs for an output port. Different parameters of module 1418 and of crossbar/multiplexer module 1422 can be configured by the software layer.

In an example implementation, modules 1400 of the proposed software layer can further include an output port configuration module 1424 configured to enable change in the number/characteristics/function/construction/type/mode of output ports. NoC router of the present disclosure can include a plurality of output ports, which can be configured to define/enable/disable the number of output ports used for communication with hosts.

Figure 15:
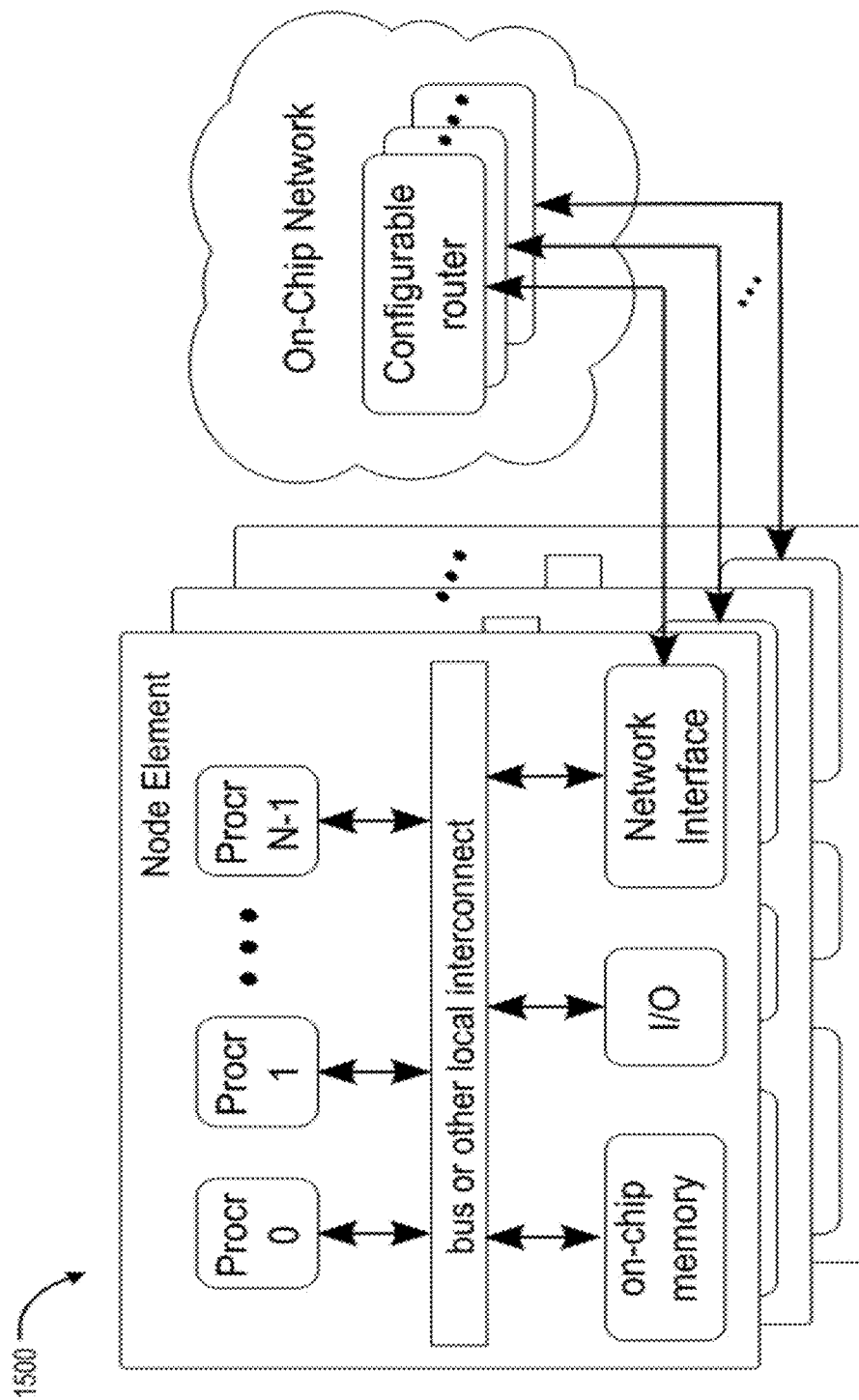
FIG. 15 illustrates an example computer system for implementing configurable NoC router in accordance with an example implementation of the present disclosure.

FIG. 15 illustrates an exemplary NoC architecture including multiple instances of configurable routers, wherein, connected to each router is a node element that includes one or more processors, memory, and a network interface. Components within the node element can communicate with each other using a bus or other local interconnect. Communication with other nodes can be facilitated by the network interface that services outgoing and incoming requests and replies. Memory can be shared by supporting remote access through the on-chip network.

Figure 16:
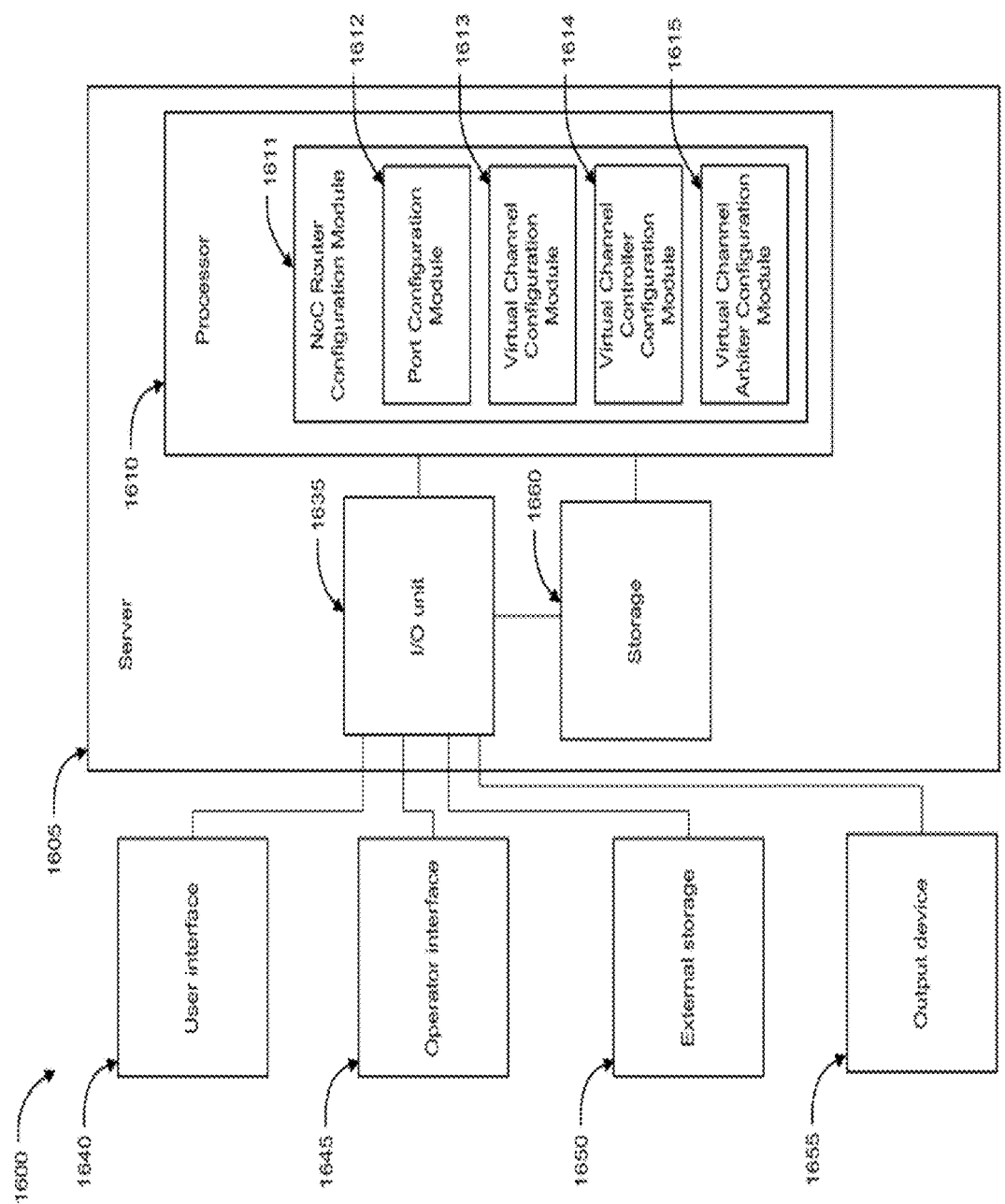
FIG. 16 illustrates an example NoC design and implementation system on which example implementations may be implemented.

FIG. 16 illustrates an example NoC design and implementation system 1600 on which example implementations may be implemented. The computer system 1600 includes a server 1605, which may involve an I/O unit 1635, storage 1660, and a processor 1610 operable to execute one or more units as known to one of skill in the art. The term "computer-readable medium" as used herein refers to any medium that participates in providing instructions to processor 1610 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 1640 and operator interfaces 1645 which may utilize input devices such as a keyboard, mouse, touch device, or verbal command.

The server 1605 may also be connected to an external storage 1650, which can contain removable storage such as a portable hard drive, optical media (CD or DVD), disk media or any other medium from which a computer can read executable code. The server may also be connected an output device 1655, such as a display to output data and other information to a user, as well as request additional information from a user. The connections from the server 1605 to the user interface 1640, the operator interface 1645, the external storage 1650, and the output device 1655 may via wireless protocols, such as the 802.11 standards, Bluetooth® or cellular protocols, or via physical transmission media, such as cables or fiber optics. The output device 1655 may therefore further act as an input device for interacting with a user.

The processor 1610 may execute one or more modules including a NoC router configuration module 1611, wherein the NoC router configuration module 1611 can include a port configuration module 1612, a virtual channel configuration module 1613, a virtual channel controller configuration module 1614, and a virtual channel arbiter configuration module 1615. NoC router configuration module 1611 can be configured to enable configuration of input/output ports, VCs, and VC buffers based on a defined NoC specification, wherein port configuration module 1612 can configure a defined number of ports for each router based on NoC specification. Virtual channel configuration module 1613, on the other hand, can, for each input and/or output port of each router, configure VCs and their respective buffers based on the input NoC specification. Virtual channel controller configuration module 1614 can be configured to upsize or downsize a flit received at an input VC and directed to an output VC based on a size ratio of the input VC and the output VC. According to one example implementation, virtual channel arbiter configuration module 1615 can be configured to arbitrate an incoming packet to perform output port selection based on information of VC/VC buffer/flit format, among other parameters. Module 1615 can further be configured to arbitrate a packet including routing information, wherein the routing information includes information indicative of one or more turns at one or more routers of the NoC. In another example implementation, module 1615 can be configured to incorporate QoS specified by a specification and arbitrate the packet keeping the QoS of one or more VCs in context.

Moreover, other implementations of the present disclosure will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A router in a Network on Chip (NoC) comprising a plurality of routers, the router comprising:

a plurality of ports, each of the plurality of ports configured with one or more virtual channels (VCs), each of the one or more VCs associated with a separate buffer, each of the one or more VCs configured to connect to specified one or more other ports or VCs of the plurality of ports based on a membership specified by a specification;

wherein a number of the plurality of ports and a number of the one or more VCs for the each of the plurality of ports is specified by the specification;

wherein a size of each of the one or more VCs and a size of the buffer is specified by the specification;

wherein the connectivity between each of the one or more VCs is specified by the specification;
wherein the one or more VCs are configured to operate in different clock domain as specified by the specification;
wherein said NoC is constructed by a software layer that configures the one or more of the plurality of routers with information from the specification and connects one or more of the plurality of ports of the one or more of the plurality of routers to one another or to one or more agents of the NoC, and that further configures the one or more of the plurality of routers with information to facilitate routing of packets between NoC agents.

2. The router of claim 1, further comprising a controller, wherein the controller is configured to upsize or downsize a flit received at an input one of the one or more VCs and directed to an output one of the one or more VCs based on a size ratio of the input one of the one or more VCs and the output one of the one or more VCs.

3. The router of claim 1, wherein the router is configured to
receive a packet at one of the one or more input VCs of one of the one or more input ports comprising a first set having first information for arbitration of the packet and second information for routing of the packet;
arbitrate the packet and upon winning the arbitration, perform output VC and output port selection of one of the plurality of output VCs and output ports from the first information;
calculate a second set having first information and second information for arbitration and routing of the packet at next NoC router using the first and second information; and
forward the second set along with the packet to the next NoC router.

4. The router of claim 3, wherein the first information of the packet is indicative of the output VC and output port at a router and second information of the packet is indicative of one or more turns at one or more routers of the NoC.

5. The router of claim 1, wherein each of the one or more VCs is associated with a Quality of Service (QoS) specified by the specification, wherein the router is configured to conduct arbitration based on the QoS of the one or more VCs.

6. The router of claim 1, wherein each of the one or more VCs is associated with a clock domain specified by the specification, and wherein the router is configured to facilitate clock domain crossing logic for the one or more VCs.

7. The router of claim 1, wherein the router is configured to facilitate independent flow control for each one of the plurality of ports that is connected to another router port or an agent of the NoC.

8. The router of claim 7, wherein the router is configured with flow control information from the specification to facilitate the independent flow control between each one of the plurality of ports of the router and the corresponding another router port or NoC agent connected to the port.

9. The router of claim 1, wherein the router further comprises an output buffering stage for one or more of the plurality of ports specified by the specification.

10. The router of claim 1, wherein the router further comprises a pipeline with one or more stages for one or more of the plurality of ports, the one or more stages and the one or more of the plurality of ports specified by the specification.

11. The router of claim 1, wherein the router is configured to, for each arbitration operation:
transmit a number of flits from the one or more input VCs of ones of the plurality of input ports to one or more output VCs of ones of the plurality of output ports; the number of flits specified by the specification.

12. A semiconductor device configured with a Network on Chip (NoC) generated from a specification, the semiconductor device comprising:
one or more hosts; and
a router, comprising:
a plurality of ports, each of the plurality of ports configured with one or more virtual channels (VCs), each of the one or more VCs associated with a separate buffer, each of the one or more VCs configured to connect to specified one or more other ports or VCs of the plurality of ports based on a membership specified by the specification;
wherein a number of the plurality of ports and a number of the one or more VCs for the each of the plurality of ports is specified by the specification;
wherein a size of each of the one or more VCs and a size of the buffer is specified by the specification;
wherein the connectivity between each of the one or more VCs is specified by the specification;
wherein the one or more VCs are configured to operate in different clock domain as specified by the specification;
wherein said NoC is constructed by a software layer that configures the one or more of the plurality of routers with information from the specification and connects one or more of the plurality of ports of the one or more of the plurality of routers to one another or to one or more agents of the NoC, and that further configures the one or more of the plurality of routers with information to facilitate routing of packets between NoC agents.

13. The semiconductor device of claim 12, wherein the router comprises a controller, wherein the controller is configured to upsize or downsize a flit received at an input one of the one or more VCs and directed to an output one of the one or more VCs, based on a size ratio of the input one of the one or more VCs and the output one of the one or more VCs.

14. The semiconductor device of claim 12, wherein the router is configured to:
receive a packet at one of the one or more input VCs of one of the one or more input ports comprising a first set having first information for arbitration of the packet and second information for routing of the packet;
arbitrate the packet and upon winning the arbitration, perform output VC and output port selection of one of the plurality of output VCs and output ports from the first information;
calculate a second set having first information and second information for arbitration and routing of the packet at next NoC router using the first and second information; and
forward the second set along with the packet to the next NoC router.

15. The semiconductor device of claim 14, wherein the first information of the packet is indicative of the output VC and output port at a router, and wherein the second information of the packet is indicative of one or more turns at one or more routers of the NoC.

16. The semiconductor device of claim 12, wherein each of the one or more VCs is associated with a Quality of Service (QoS) specified by the specification, wherein the router is configured to conduct arbitration based on the QoS of the one or more VCs.

17. The semiconductor device of claim 12, wherein each of the one or more VCs is associated with a clock domain specified by the specification, and wherein the router is configured to facilitate clock domain crossing logic for the one or more VCs.

18. The semiconductor device of claim 12, wherein the router is configured to facilitate independent flow control for each one of the plurality of ports that is connected to another router port or an agent of the NoC.

* * * * *